US011574425B2

United States Patent
Kim et al.

(10) Patent No.: US 11,574,425 B2
(45) Date of Patent: Feb. 7, 2023

(54) METHOD FOR PROVIDING DRAWING EFFECTS BY DISPLAYING A DRAWING OUTPUT CORRESPONDING TO A DRAWING INPUT USING A PLURALITY OF OBJECTS, AND ELECTRONIC DEVICE SUPPORTING THE SAME

(71) Applicant: Samsung Electronics Co., Ltd., Suwon-si (KR)

(72) Inventors: Keunsoo Kim, Suwon-si (KR); Banghyun Kwon, Suwon-si (KR); Jeonghoon Kim, Suwon-si (KR); Junyoung Kim, Suwon-si (KR); Nahyeong Park, Suwon-si (KR); Jinwan An, Suwon-si (KR); Jiwoo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/250,555

(22) PCT Filed: Aug. 2, 2019

(86) PCT No.: PCT/KR2019/009650
§ 371 (c)(1),
(2) Date: Feb. 2, 2021

(87) PCT Pub. No.: WO2020/027614
PCT Pub. Date: Feb. 6, 2020

(65) Prior Publication Data
US 2021/0295573 A1 Sep. 23, 2021

(30) Foreign Application Priority Data
Aug. 2, 2018 (KR) .......................... 10-2018-0090214

(51) Int. Cl.
*G06T 11/00* (2006.01)
*G06T 7/90* (2017.01)
(Continued)

(52) U.S. Cl.
CPC ............ *G06T 11/001* (2013.01); *G06F 3/038* (2013.01); *G06F 3/03545* (2013.01);
(Continued)

(58) Field of Classification Search
CPC .... G06F 3/04883; G06F 3/0383; G06F 3/038; G06F 3/03545; G06F 3/041;
(Continued)

(56) References Cited

U.S. PATENT DOCUMENTS 8,594,740 B2    11/2013   Wang et al.
9,607,421 B2     3/2017   Lee et al.
(Continued)

FOREIGN PATENT DOCUMENTS

JP        2018-067068 A     4/2018
KR   10-2011-0095287 A     8/2011
(Continued)

OTHER PUBLICATIONS

International Search Report and Written Opinion of the International Searching Authority in connection with International Application No. PCT/KR2019/009650 dated Nov. 26, 2019, 8 pages.
(Continued)

*Primary Examiner* — Yaron Cohen

(57) ABSTRACT

Various embodiments of the present invention relate to a method for displaying a stylus pen input, and an electronic device for same, the electronic device including: a touch screen display; a wireless communication circuit; processors operatively connected to the touch screen display and the wireless communication circuit; and a memory operatively connected to the processor. The memory may store instruc-
(Continued)

tions which, when executed, cause at least one of the processors to: display a user interface on the touch screen display; receive a drawing input that has at least one drawing path formed with a stylus pen or part of a user's body through the user interface; and display a drawing output on the user interface. The drawing output includes: a first layer including a plurality of first objects having shapes selected along the drawing path; and a second layer including a plurality of moving second objects having the selected shapes, wherein the plurality of moving second objects can move from the drawing path in at least one selected direction.

18 Claims, 30 Drawing Sheets

(51) Int. Cl.
| | | |
|---|---|---|
| *G06F 3/0354* | (2013.01) | |
| *G06F 3/038* | (2013.01) | |
| *G06F 3/041* | (2006.01) | |
| *G06F 3/04883* | (2022.01) | |
| *G06T 13/00* | (2011.01) | |

(52) U.S. Cl.
CPC .......... *G06F 3/041* (2013.01); *G06F 3/04883* (2013.01); *G06T 7/90* (2017.01); *G06T 13/00* (2013.01); *G06T 2200/24* (2013.01)

(58) Field of Classification Search
CPC .............. G06F 3/04845; G06F 1/1626; G06F 2200/1632; G06T 11/001; G06T 7/90; G06T 11/00; G06T 13/00; G06T 2200/24; G06T 11/60
See application file for complete search history.

(56) References Cited

U.S. PATENT DOCUMENTS

| | | |
|---|---|---|
| 9,753,556 B2 | 9/2017 | Bernstein et al. |
| 2010/0134499 A1* | 6/2010 | Wang ...................... G06T 13/80 345/473 |
| 2015/0195335 A1 | 7/2015 | Park |
| 2018/0121076 A1* | 5/2018 | Hamada .............. G06F 3/04845 |
| 2019/0012027 A1 | 1/2019 | Park et al. |

FOREIGN PATENT DOCUMENTS

| | | |
|---|---|---|
| KR | 10-2013-0091437 A | 8/2013 |
| KR | 10-2015-0083002 A | 7/2015 |
| KR | 10-2017-0019879 A | 2/2017 |

OTHER PUBLICATIONS

Korean Intellectual Property Office, "Notice of Preliminary Rejection," dated Nov. 3, 2022, in connection with Korean Patent Application No. KR10-2018-0090214, 11 pages.

* cited by examiner

METHOD FOR PROVIDING DRAWING EFFECTS BY DISPLAYING A DRAWING OUTPUT CORRESPONDING TO A DRAWING INPUT USING A PLURALITY OF OBJECTS, AND ELECTRONIC DEVICE SUPPORTING THE SAME

CROSS-REFERENCE TO RELATED APPLICATIONS

This application is a 371 National Stage of International Application No. PCT/KR2019/009650, filed Aug. 2, 2019, which claims priority to Korean Patent Application No. 10-2018-0090214, filed Aug. 2, 2018, the disclosures of which are herein incorporated by reference in their entirety.

BACKGROUND

1. Field

Various embodiments of the disclosure relate to a method for displaying a stylus pen input and an electronic device therefor.

2. Description of Related Art

Electronic devices (for example, mobile terminals, smartphones, or wearable devices) may provide various functions. For example, smartphones may provide, in addition to the basic voice communication function, various functions such as a short-range wireless communication (for example, Bluetooth, Wi-Fi, or near-field communication (NFC)) function, a mobile communication (3rd generation (3G), 4G, or 5G) function, a music/moving image playback function, an imaging function, or a navigation function.

In addition, electronic devices may include various input sensing panels. For example, electronic devices may include an input sensing panel such as a touch screen panel (TSP), a digitizer panel, or a force touch panel. The input sensing panel may be stacked on or attached to a display panel. The digitizer panel may support inputs using a stylus pen. There has recently been development of a technology for enabling an electronic device to sense a stylus pen input and displaying the stylus pen input.

SUMMARY

Various embodiments of the disclosure provide a method for displaying a stylus pen input and an electronic device therefor.

According to various embodiments of the disclosure, an electronic device may include: a touchscreen display; a wireless communication circuit; a processor configured to be operatively connected to the touchscreen display and the wireless communication circuit; and a memory configured to be operatively connected to the processor. The memory may store instructions that, when executed, cause the processor to: display a user interface on the touchscreen display; receive a drawing input having at least one drawing path by a stylus pen or a body part of a user through the user interface; and display a drawing output on the user interface. The drawing output may include a first layer including a plurality of first objects having a selected shape according to the drawing path and a second layer including a plurality of animated second objects having the selected shape, and the plurality of animated second objects moves in at least one selected direction from the drawing path.

According to various embodiments of the disclosure, an operating method of an electronic device may include: displaying a user interface on a touchscreen display; receiving a drawing input having at least one drawing path by a stylus pen or a body part of a user through the user interface; and displaying a drawing output on the user interface. The drawing output may include a first layer including a plurality of first objects having a selected shape according to the drawing path and a second layer including a plurality of animated second objects having the selected shape. The plurality of animated second objects may move in at least one selected direction from the drawing path.

A method and an electronic device therefor, according to various embodiments, may provide various colors and effects desired by the user, besides a simple stylus pen input, thereby improving the user experience.

DETAILED DESCRIPTION

Hereinafter, various embodiments disclosed herein are described with reference to the accompanying drawings.

Figure 1:
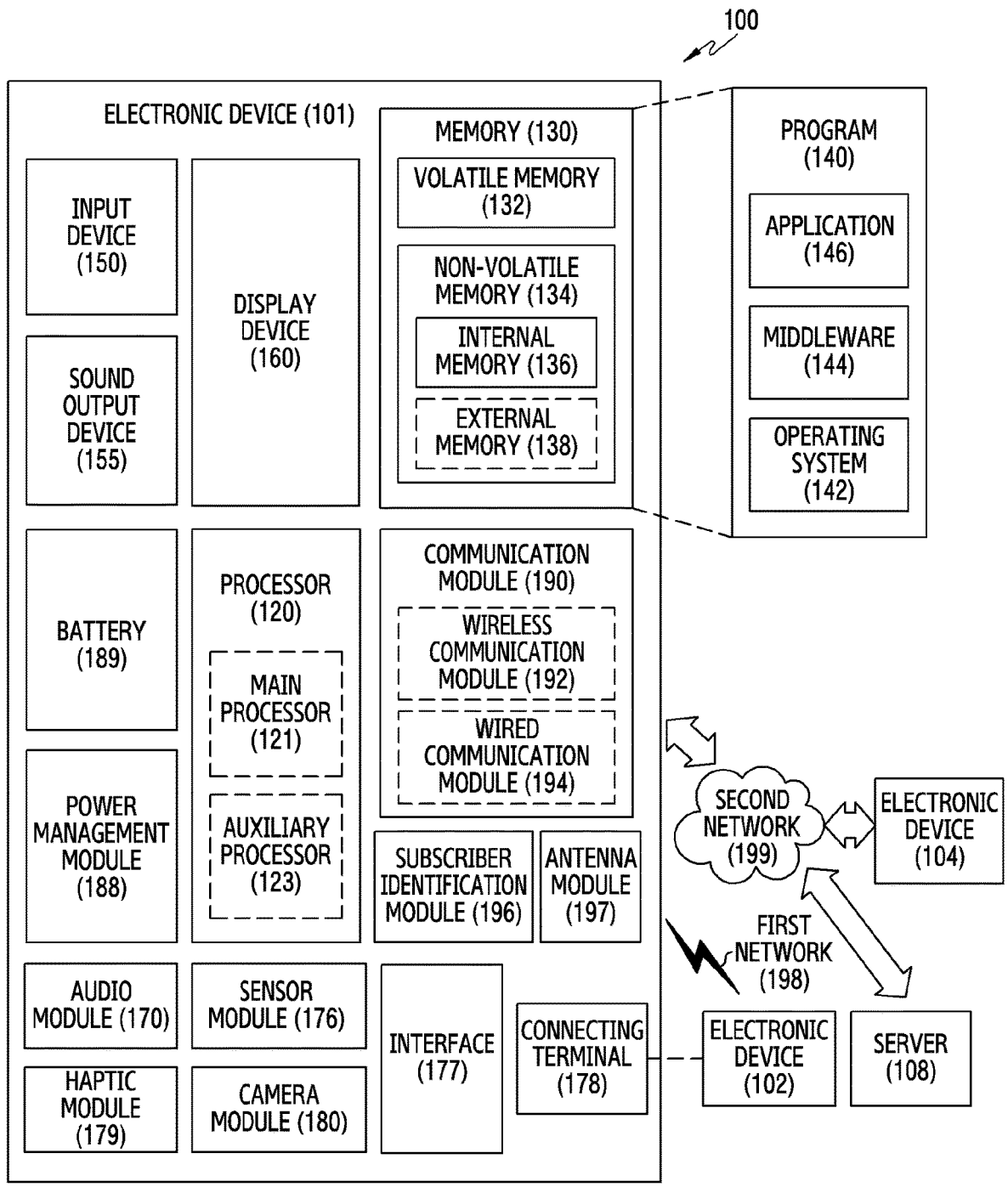
FIG. 1 illustrates an electronic device in a network environment according to various embodiments of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
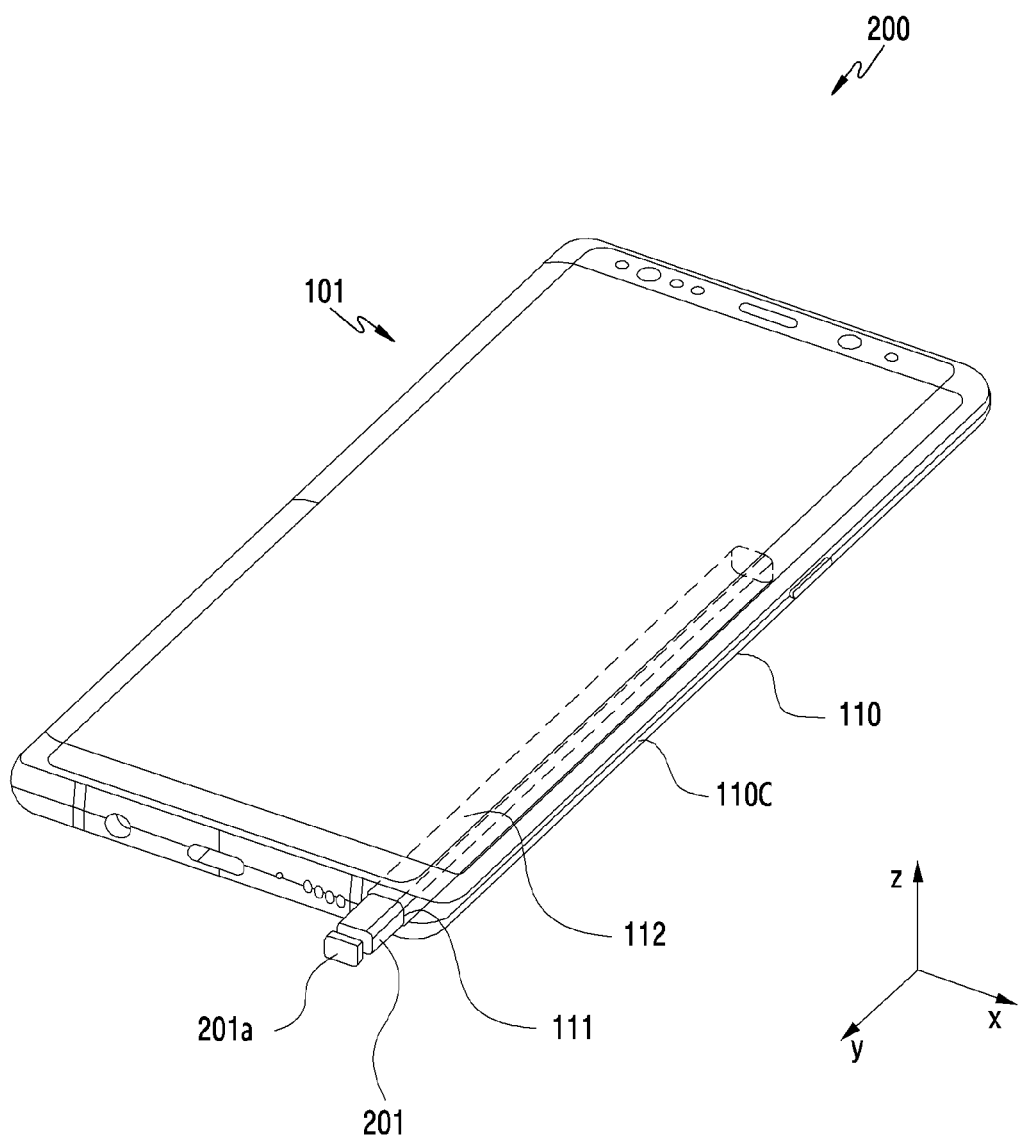
FIG. 2 is a perspective view 200 of an electronic device including a digital pen according to various embodiments of the disclosure.

FIG. 2 is a perspective view 200 of an electronic device including a digital pen according to various embodiments of the disclosure.

Referring to FIG. 2, the electronic device 101 according to an embodiment may include the configuration illustrated in FIG. 1 and may include a structure in which the digital pen 201 (e.g., a stylus pen) can be inserted. The electronic device 101 may include a housing 110 and may include a hole 111 in one portion of the housing, for example, one portion on a lateral side 110C. The electronic device 101 may include a storage space 112 connected to the hole 111, and the digital pen 201 may be inserted in the storage space 112. According to the illustrated embodiment, the digital pen 201 may include a pressable button 201a at one end thereof so that the digital pen 201 is easily taken out from the storage space 112 of the electronic device 101. When the button 201a is pressed, repulsion mechanisms (e.g., at least one spring) configured in connection with the button 201a may operate, so that the digital pen 201 may be detached from the storage space 112.

Figure 3:
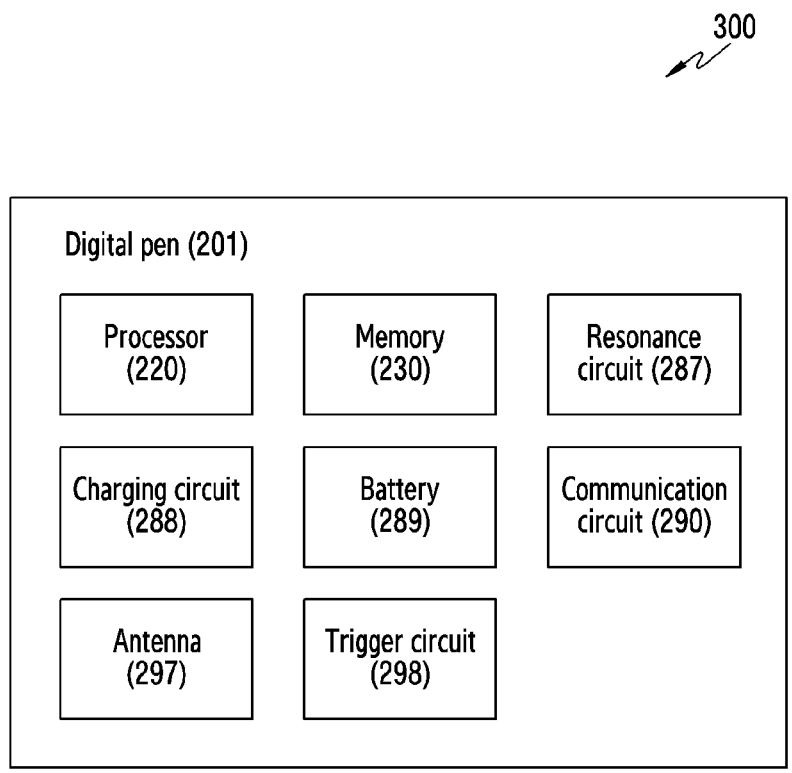
FIG. 3 is a block diagram 300 illustrating a digital pen according to various embodiments of the disclosure.

FIG. 3 is a block diagram 300 illustrating a digital pen according to various embodiments of the disclosure.

Referring to FIG. 3, the digital pen 201 according to an embodiment may include a processor 220, a memory 230, a resonance circuit 287, a charging circuit 288, a battery 289, a communication circuit 290, an antenna 297, and/or a trigger circuit 298. In some embodiments, the processor 220, at least part of the resonance circuit 287, and/or at least part of the communication circuit 290 of the digital pen 201 may be configured on a printed circuit board or as a chip. The processor 220, the resonance circuit 287, and/or the communication circuit 290 may be electrically connected to the memory 230, the charging circuit 288, the battery 289, the antenna 297, or the trigger circuit 298. According to an embodiment, the digital pen 201 may include only a resonance circuit and a button.

The processor 220 may include a customized hardware module or a generic processor configured to execute software (e.g., an application program). The processor may include a hardware element (function) or a software element (program) including at least one of various sensors, a data measurement module, an input/output interface, a module for managing the state or environment of the digital pen 201, or a communication module included in the digital pen 201. The processor 220 may include, for example, one of hardware, software, or firmware or a combination of two or more thereof. According to an embodiment, the processor 220 may receive a proximity signal corresponding to an electromagnetic signal generated from a digitizer 160 of an electronic device 101 through the resonance circuit 287. When the proximity signal is identified, the processor 220 may control the resonance circuit 287 to transmit an electromagnetic resonance (EMR) input signal to the electronic device 101.

The memory 230 may store information related to the operation of the digital pen 201. For example, the information may include information for communication with the electronic device 101 and frequency information related to an input operation of the digital pen 201.

The resonance circuit 287 may include at least one of a coil, an inductor, and a capacitor. The resonance circuit 287 may be used for the digital pen 201 to generate a signal including a resonant frequency. For example, to generate the signal, the digital pen 201 may use at least one of an electromagnetic resonance (EMR) method, an active electrostatic (AES) method, or an electrically coupled resonance (ECR) method. When the digital pen 201 transmits a signal by the EMR method, the digital pen 201 may generate a signal including a resonant frequency based on an electromagnetic field generated from an inductive panel of the electronic device 101. When the digital pen 201 transmits a signal by the AES method, the digital pen 201 may generate a signal using capacity coupling with the electronic device 101. When the digital pen 201 transmits a signal by the ECR method, the digital pen 201 may generate a signal including a resonant frequency based on an electric field generated from a capacitive device of the electronic device. According to an embodiment, the resonance circuit 287 may be used to change the strength or frequency of an electromagnetic field according to a user's manipulation. For example, the resonance circuit 287 may provide a frequency for recognizing a hovering input, a drawing input, a button input, or an erasing input.

When connected to the resonance circuit 287 based on a switching circuit, the charging circuit 288 may rectify a resonance signal generated from the resonance circuit 287 into a DC signal and may provide the DC signal to the battery 289. According to an embodiment, the digital pen 201 may identify whether the digital pen 201 is inserted into the electronic device 101 using the voltage level of a DC signal detected by the charging circuit 288.

The battery 289 may be configured to store power required for the operation of the digital pen 201. The battery may include, for example, a lithium-ion battery or a capacitor and may be rechargeable or replaceable. According to an embodiment, the battery 289 may be charged using power (e.g., the DC signal (DC power)) provided from the charging circuit 288.

The communication circuit 290 may be configured to perform a wireless communication function between the digital pen 201 and a communication module 190 of the electronic device 101. According to an embodiment, the communication circuit 290 may transmit state information about the digital pen 201 and input information to the electronic device 101 using a short-range communication method. For example, the communication circuit 290 may transmit direction information (e.g., motion sensor data) about the digital pen 201 obtained through the trigger circuit 298, voice information input through a microphone, or information about the remaining amount of the battery 289 to the electronic device 101. The short-range communication method may include at least one of Bluetooth, Bluetooth Low Energy (BLE), and a wireless LAN.

The antenna 297 may be used to transmit a signal or power to the outside (e.g., the electronic device 101) or to receive the same from the outside. According to an embodiment, the digital pen 201 may include a plurality of antennas 297 and may select at least one antenna 297 suitable for a communication method from among the plurality of antennas 297. The communication circuit 290 may exchange a signal or power with an external electronic device through the selected at least one antenna 297.

The trigger circuit 298 may include at least one button or sensor circuit. According to an embodiment, the processor 220 may identify the input method (e.g., touch or press) or the type (e.g., an EMR button or a BLE button) of a button of the digital pen 201. According to an embodiment, the sensor circuit may generate an electrical signal or a data value corresponding to an internal operating state of the digital pen 201 or an external environmental state. For example, the sensor circuit may include at least one of a motion sensor, a battery level detection sensor, a pressure sensor, an optical sensor, a temperature sensor, a geomagnetic sensor, and a biometric sensor. According to an embodiment, the trigger circuit 298 may transmit a trigger signal to the electronic device 101 using an input signal of the button or a signal through a sensor.

Figure 4:
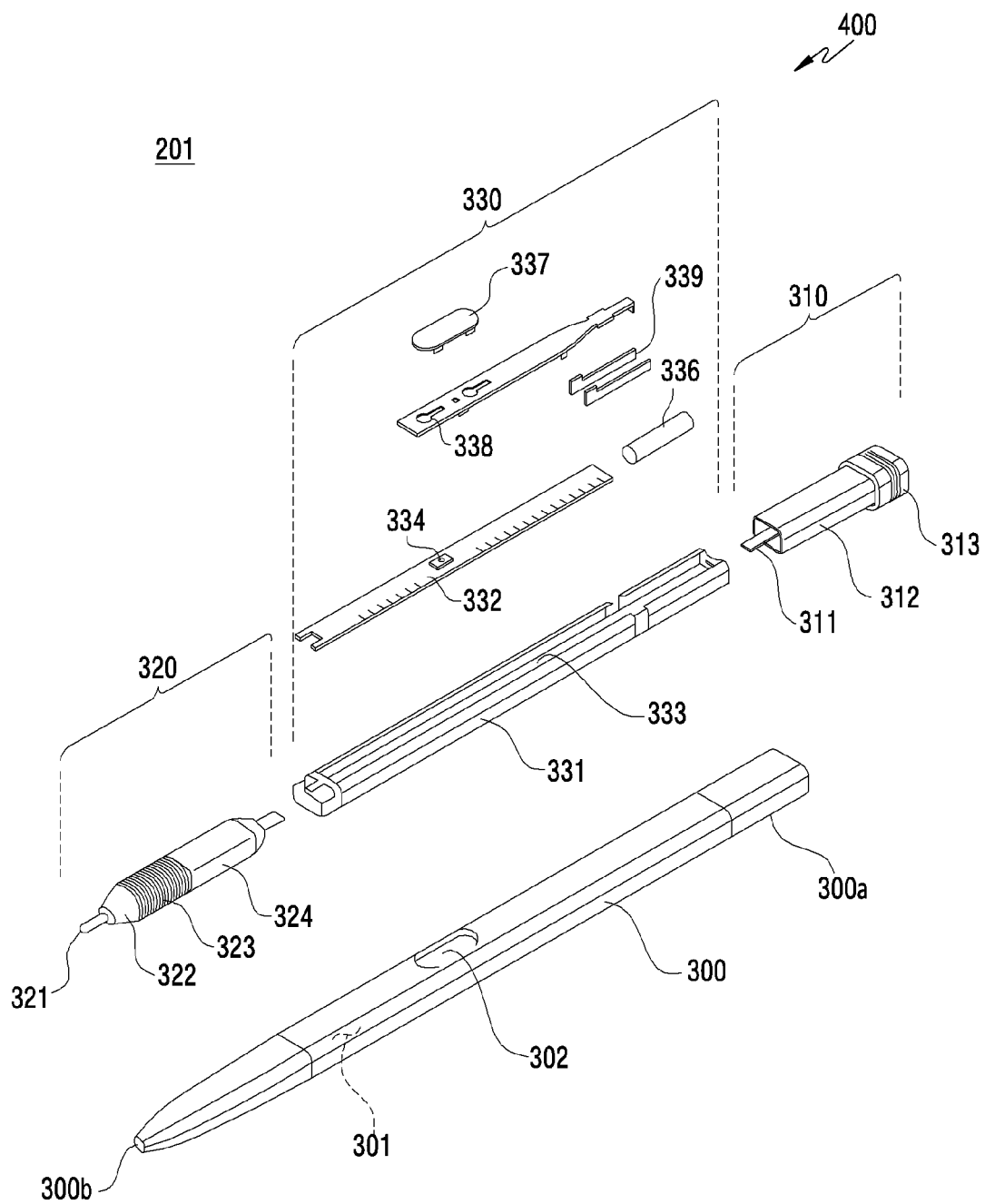
FIG. 4 is an exploded perspective view 400 of a digital pen according to various embodiments of the disclosure.

FIG. 4 is an exploded perspective view 400 of a digital pen according to various embodiments of the disclosure.

Referring to FIG. 4, the digital pen 201 may include a pen housing 300 forming the external appearance of the digital pen 201 and an inner assembly inside the pen housing 300. In the illustrated embodiment, the inner assembly may include all various components mounted in the pen and may be inserted into the pen housing 300 in a single assembly operation.

The pen housing 300 has a shape elongating between a first end portion 300*a* and a second end portion 300*b* and may include a storage space 301 therein. The pen housing 300 may have an elliptical cross-section having a major axis and a minor axis and may be formed in an elliptical column shape as a whole. A storage space 112 of an electronic device 101 may also have an elliptical cross section corresponding to the shape of the pen housing 300. The pen housing 300 may include a synthetic resin (e.g., plastic) and/or a metallic material (e.g., aluminum). According to an embodiment, the second end portion 300*b* of the pen housing 300 may include a synthetic resin material.

The inner assembly may have an elongated shape corresponding to the shape of the pen housing 300. The inner assembly may be largely divided into three components according to a lengthwise direction. For example, the inner assembly may include an ejection member 310 disposed at a position corresponding to the first end portion 300*a* of the pen housing 300, a coil unit 320 disposed at a position corresponding to the second end portion 300*b* of the pen housing 300, and a circuit board unit 330 disposed at a position corresponding to a body of the housing.

The ejection member 310 may include a configuration for taking out the digital pen 201 from the storage space 112 of the electronic device 101. According to an embodiment, the ejection member 310 may include a shaft 311, an ejection body 312 that is disposed around the shaft 311 and forms the overall external appearance of the ejection member 310, and a button unit 313. When the inner assembly is completely inserted into the pen housing 300, a portion including the shaft 311 and the ejection body 312 may be surrounded by the first end portion 300*a* of the pen housing 300, and the button unit 313 (e.g., 201*a* of FIG. 2) may be exposed outside the first end portion 300*a*. In the ejection body 312, a plurality of components, for example, cam members or elastic members, not shown, may be disposed to form a push-pull structure. In an embodiment, the button unit 313 may be substantially coupled to the shaft 311 to perform a linear reciprocating motion with respect to the ejection body 312. According to various embodiments, the button unit 313 may include a button having a groove structure so that a user can take out the digital pen 201 using a fingernail. According to an embodiment, the digital pen 201 may include a sensor to detect a linear reciprocating motion of the shaft 311, thereby providing a different input method.

The coil unit 320 may include a pen tip 321 exposed outside the second end portion 300*b* when the inner assembly is completely inserted into the pen housing 300, a packing ring 322, and a coil wound a plurality of times, and/or a pen pressure sensor 324 to obtain a change in pressure according to pressurization of the pen tip 321. The packing ring 322 may include epoxy, rubber, urethane, or silicone. The packing ring 322 may be provided for waterproofing and dustproofing and may protect the coil unit 320 and the circuit board unit 330 from water or dust infiltration. According to an embodiment, the coil 323 may form a resonant frequency in a set frequency band (e.g., 500 kHz) and may be combined with at least one device (e.g., a capacitive device) to adjust the resonant frequency formed by the coil 323 in a certain range.

The circuit board unit 330 may include a printed circuit board 332, a base 331 surrounding at least one surface of the printed circuit board 332, and an antenna. According to an embodiment, a substrate mounting portion 333 on which the printed circuit board 332 is disposed may be formed on an upper surface of the base 331, and the printed circuit board 332 may be fixed to the substrate mounting portion 333, being mounted thereon. According to an embodiment, the printed circuit board 332 may include an upper surface and a lower surface, a variable capacitance capacitor or a switch 334 connected to the coil 323 may be disposed on the upper surface, and a charging circuit, a battery, or a communication circuit may be disposed on the lower surface. The battery may include an electric double-layer capacitor (EDLC). The charging circuit may be disposed between the coil 323 and the battery and may include voltage detector circuitry and a rectifier.

The antenna may include an antenna structure 339 as illustrated in FIG. 4 and/or an antenna that is embedded in the printed circuit board 332. According to various embodiments, the switch 334 may be provided on the printed circuit board 332. A side button 337 provided in the digital pen 201 may be used to press the switch 334 and may be exposed to the outside through a side opening 302 of the pen housing 300. When the side button 337 is supported by a support member 338 and no external force is exerted on the side button 337, the support member 338 may provide an elastic restoring force, thus restoring or maintaining the side button 337 to be disposed at a predetermined position.

The circuit board unit 330 may include another packing ring, such as an O-ring. For example, O-rings manufactured with an elastic body may be disposed at both ends of the base 331, thereby forming a sealing structure between the base 331 and the pen housing 300. In an embodiment, the support member 338 may be disposed closely to an inner wall of the pen housing 300 partially around the side opening 302, thereby forming a sealing structure. For example, the circuit board unit 330 may also have a waterproof and dustproof structure similar to the packing ring 322 of the coil part 320.

The digital pen 201 may include a battery mounting portion 335 on which the battery 336 is disposed on the upper surface of the base 331. The battery 336 that can be mounted on the battery mounting portion 335 may include, for example, a cylinder-type battery.

The digital pen 201 may include a microphone (not shown). The microphone may be directly connected to the printed circuit board 332 or may be connected to a separate flexible printed circuit board (FPCB, not shown) connected to the printed circuit board 332. According to various embodiments, the microphone may be disposed at a position parallel with the side button 337 in a lengthwise direction of the digital pen 201.

Figure 5:
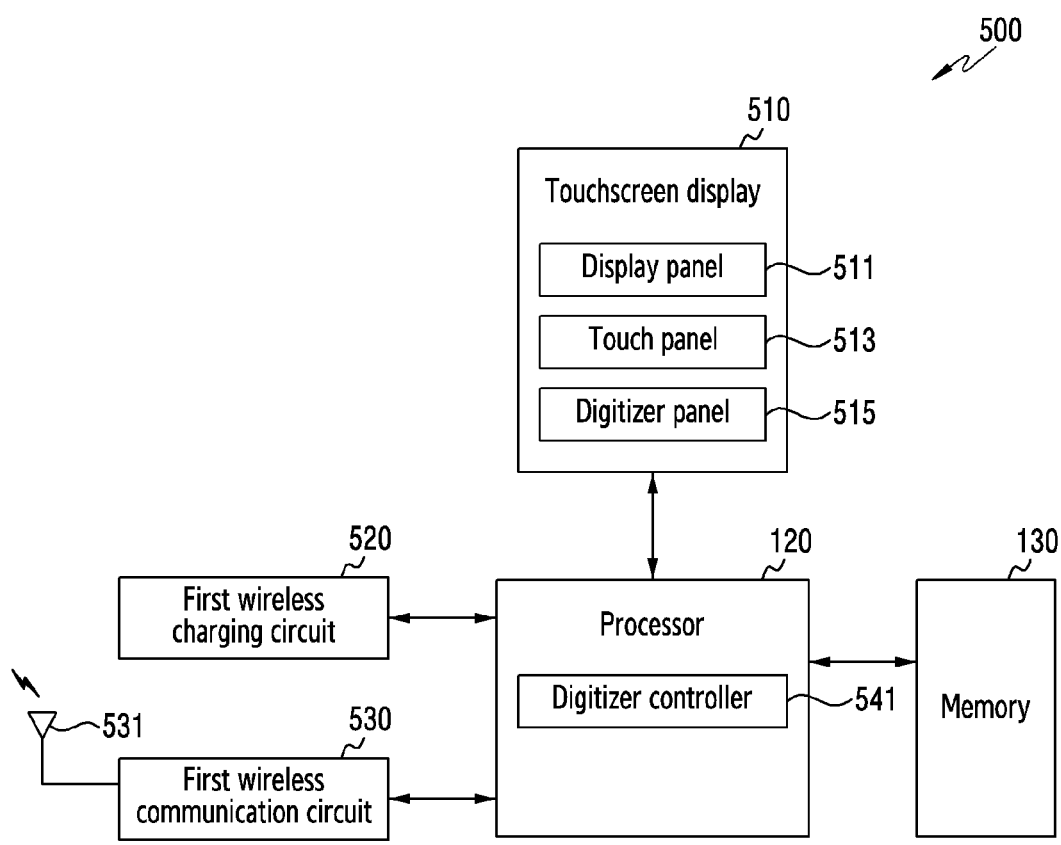
FIG. 5 is a block diagram 500 illustrating an electronic device according to various embodiments of the disclosure.

FIG. 5 is a block diagram 500 illustrating an electronic device according to various embodiments of the disclosure.

Referring to FIG. 5, the electronic device 101 (e.g., the electronic device 101 of FIG. 1) according to an embodiment of the disclosure may include a processor 120, a memory 130, a touchscreen display 510 (e.g., the display device 160 of FIG. 1), a first wireless charging circuit 520, and a first wireless communication circuit 530 (e.g., the wireless communication module 192 of FIG. 1).

The processor 120 according to an embodiment of the disclosure may control the overall operation of the electronic device 101. For example, the processor 120 may be positioned in a housing (not shown) of the electronic device 101 and may be operatively (or electrically) connected to the memory 130, the touchscreen display 510, the first wireless charging circuit 520, and the first wireless communication circuit 530 to control each component of the electronic device 101.

The processor 120 according to an embodiment of the disclosure may include a digitizer controller 541. The digitizer controller 541 may transmit a position detection signal through a digitizer panel 515 and may receive a response signal from a resonance circuit of a digital pen. The digitizer controller 541 may analyze the received response signal, thereby determining position information about the digital pen. Alternatively, the digitizer controller 541 may transmit a detection signal through a coil included in the first wireless charging circuit 520 and may receive a signal from a digital pen to identify whether the digital pen is physically or electrically coupled. Alternatively, the digitizer controller 541 may apply a charging signal having a higher voltage than that of a detection signal to the coil of the first wireless charging circuit 520, thereby charging a battery (or supercapacitor) of the digital pen.

According to an embodiment, the digitizer controller 541 may be a separate component. The processor 120 may receive information about whether a digital pen (e.g., the digital pen 201 of FIG. 2) is inserted from the digitizer controller 541, may transmit a wireless communication connection command to the first wireless communication circuit 530 based on the received information about whether the digital pen is inserted, and may transmit a charging signal and a control signal to the digitizer controller 541 based on data received from the first wireless communication circuit 530. A detailed description of the processor 120 will be described with reference to FIG. 5 to FIG. 26.

The memory 130 according to an embodiment of the disclosure may be operatively (or electrically) connected to the processor 120. The memory 130 according to an embodiment of the disclosure may include an encrypting file system (EFS) area and may store unique reference information and/or pairing-related data (e.g., bonding data) about a previously connected digital pen in the EFS area. The unique reference information may include the Bluetooth address of the previously connected digital pen, and the pairing-related data is data generated in pairing and may include at least one shared secret key used for secure connection.

The touchscreen display 510 according to an embodiment of the disclosure may be exposed through a portion of the housing and may provide an input function and an output function. For example, the touchscreen display 510 may include a display panel 511, a touch panel 513, and the digitizer panel 515. The display panel 511 may be, for example, a liquid crystal display (LCD), a light-emitting diode (LED) display, an organic light-emitting diode (OLED) display, a microelectromechanical system (MEMS) display, or an electronic paper display. The touch panel 513 may sense (or recognize) a change in physical properties (capacitance or frequency) by various touch inputs (e.g., a tap, a double tap, a touch, a touch movement, or a multi-touch) using an input tool (e.g., a finger) and may transmit the change to the processor 120. The digitizer panel 515 may sense an electromagnetic change according to an input through a digital pen and may transmit the electromagnetic change to the digitizer controller 541 of the processor 120. The touchscreen display 510 may further include a pressure sensing panel (not shown) for pressure sensing.

The first wireless charging circuit 520 according to an embodiment of the disclosure may be disposed adjacent to a hole (e.g., the hole 111 of FIG. 2) formed in the housing of the electronic device 101. The first wireless charging circuit 520 according to an embodiment of the disclosure may supply power for charging a battery (e.g., the battery 289 of FIG. 3) of a digital pen inserted into the hole. The first wireless charging circuit 520 may be turned on for a first specified time (e.g., 9 seconds) and may be turned off for a second specified time (e.g., 1 second) under control of the processor 120.

The first wireless charging circuit 520 according to an embodiment of the disclosure may be turned on or off in a random pattern under control of the processor 120 (or the digitizer controller 541) in order to identify (or verify) whether a pen with which communication is currently established is an inserted pen.

The first wireless communication circuit 530 according to an embodiment of the disclosure may be disposed in the housing of the electronic device 101 and may establish a wireless communication channel with an external electronic device (e.g., the digital pen 201 of FIG. 2). The first wireless communication circuit 530 may receive unique information from a digital pen through an antenna 531 during or after charging of the digital pen.

The first wireless communication circuit 530 may support a Bluetooth protocol. For example, the first wireless communication circuit 530 may be a BLE communication circuit. The first wireless communication circuit 530 according to an embodiment of the disclosure may scan a connectable digital pen when insertion of a digital pen (e.g., the digital pen 201 of FIG. 2) is detected or when a charging signal is applied. The first wireless communication circuit 530 may receive an advertising signal of a digital pen. The advertising signal may include charging-related information.

Although not shown in FIG. 5, the electronic device 101 may further include at least one different component (e.g., a camera module, an audio module, or a sensor module) equivalent to the described components.

Figure 6:
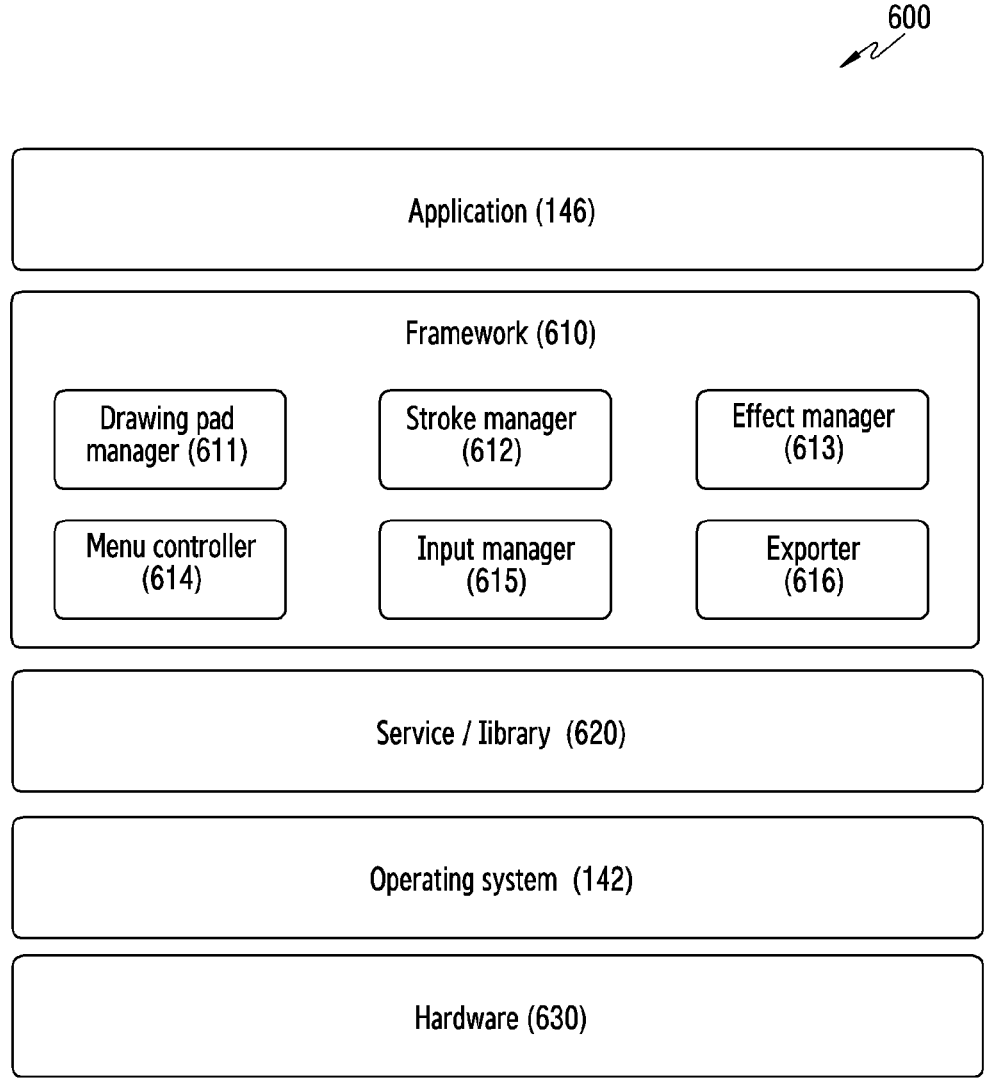
FIG. 6 is a block diagram 600 illustrating a software stack of an electronic device according to various embodiments of the disclosure.

FIG. 6 is a block diagram 600 illustrating a software stack of an electronic device according to various embodiments of the disclosure.

Referring to FIG. 6, the electronic device (e.g., the electronic device 101 of FIG. 1) according to an embodiment may store various pieces of data used by at least one component (e.g., the processor 120 or the sensor module 176 of FIG. 1) of the electronic device in a memory (e.g., the memory 130 of FIG. 1) of the electronic device. For example, the data may include software (e.g., the program 140 of FIG. 1) and input data or output data about a command related to the software. The software stack of the electronic device according to an embodiment may include an application 146, a framework 610, a service and library 620, an operating system 142, and hardware 630 included in a program.

The software stack of the electronic device according to an embodiment may include the framework 610. The framework 610 may be included in middleware (e.g., the middleware 144 of FIG. 1) of the electronic device. In an embodiment, the framework 610 may include a drawing pad manager 611, a stroke manager 612, an effect manager 613, a menu controller 614, an input manager 615, and an exporter 616 in order to receive an input through a stylus pen and to output the input along with an effect.

Figure 7:
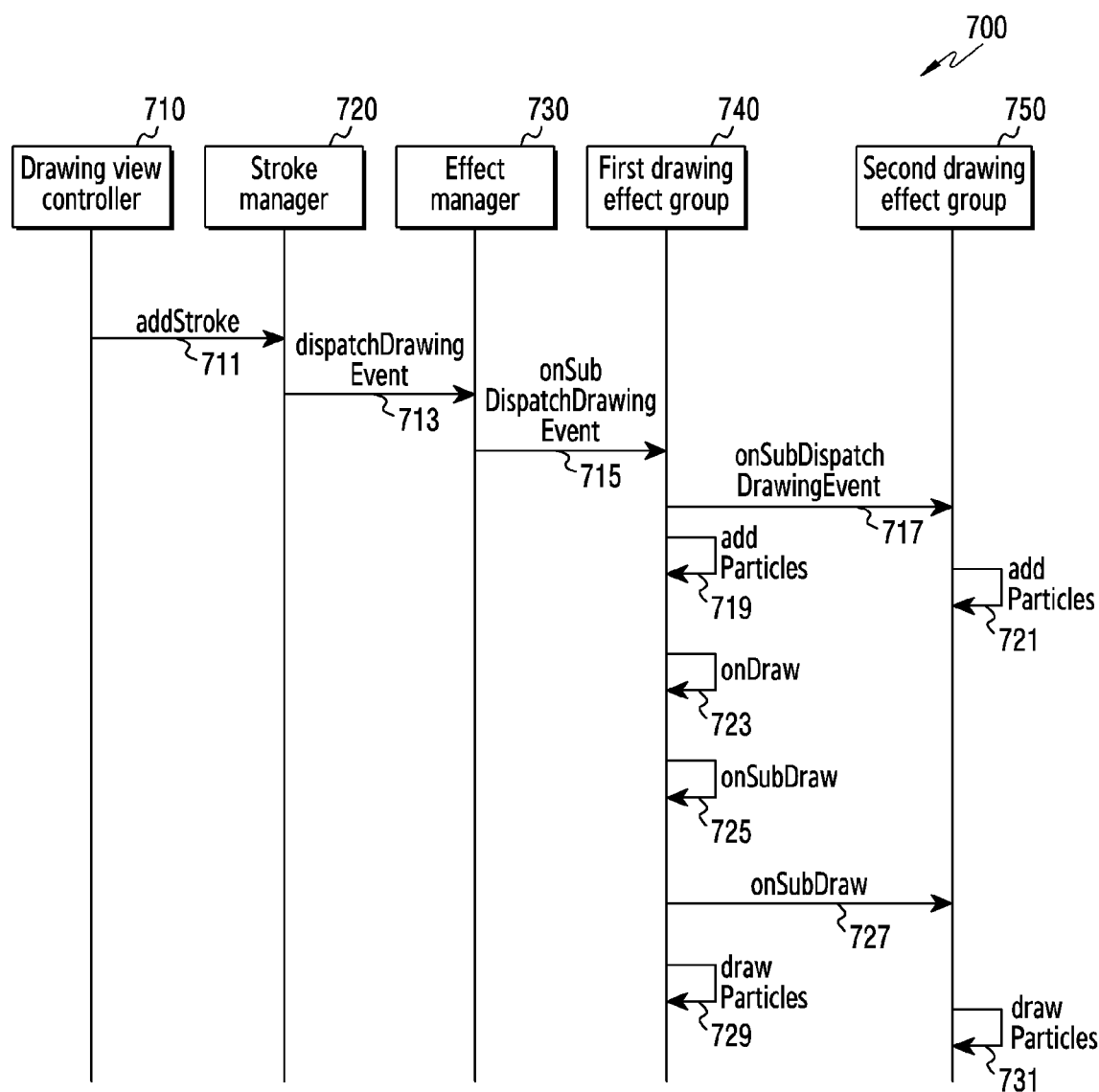
FIG. 7 is a sequence diagram 700 illustrating a process of displaying the output of a stylus pen through software of an electronic device according to various embodiments of the disclosure.

FIG. 7 is a sequence diagram 700 illustrating a process of displaying the output of a stylus pen through software of an electronic device according to various embodiments of the disclosure. In the following embodiment, individual operations may be sequentially performed but may not necessarily be performed in sequence. For example, the individual operations may be performed in a different order, and at least two operations may be performed in parallel. The electronic device of FIG. 7 may be the electronic device 101 of FIG. 1.

Referring to FIG. 7, the electronic device (e.g., the processor 120 of FIG. 1) according to various embodiments may include a framework (e.g., 610 of FIG. 6). The framework 610 according to an embodiment may include a drawing view controller 710, a stroke manager 720, an effect manager 730, a first drawing effect group (drawing effect group alpha) 740, and a second drawing effect group (drawing effect group beta) 750.

In an embodiment, the processor 120 may generate a drawing pad controller (e.g., the drawing pad manager 611 of FIG. 6) in a live drawing controller to request a background setting for receiving an input through a stylus pen (e.g., the digital pen 201 of FIG. 2). The drawing pad controller may generate a background class and may generate a background corresponding to the background setting. When it is ready to receive an input through the stylus pen 201 through generation of the background, a user may enter an input to the drawing view controller 710 with the stylus pen 201. When the user enters an input with the stylus pen 201, the drawing view controller 710 may transmit an addStroke message to the stroke manager 720 (operation 711). Upon receiving the addStroke message, the stroke manager 720 may accumulate an event of addStroke.

In an embodiment, the stroke manager 720 may transmit the accumulated event of addStroke to the effect manager 730 through a dispatchDrawingEvent message (operation 713). The effect manager 730 may transmit an effect to the first drawing effect group 740 through an onSubDispatchDrawingEvent message (operation 715) or may transmit a displayed drawing effect of the stylus pen 201 to the second drawing effect group 750 via the first drawing effect group 740 through an onSubDispatchDrawingEvent message (operation 717) according to the type of the selected stylus pen 201.

In an embodiment, drawing effects may be grouped according to a type (e.g., an Alive effect or a Rainbow effect) and may be displayed on a display device (e.g., 160 of FIG. 1) of the electronic device 101. The first drawing effect group 740 may determine a first group having effects that are first left on the display device 160 or are first generated to spread. The second drawing effect group 750 may determine a second group having effects that are subsequently left on the display device 160 or are subsequently generated to spread. In an embodiment, there may be one to six independent groups, and the number of groups is not limited to the foregoing description.

In an embodiment, the first drawing effect group 740 and the second drawing effect group 750 may generate a subgroup by continuously calling an event when each group has a subgroup. For example, the first drawing effect group 740 may add a first object through an addParticles message (operation 719), and the second drawing effect group 750 may also add a second object through an addParticles message (operation 721). The first drawing effect group 740 may call an event through an onDraw message (operation 723), may call an event through an onSubDraw message when there is a subgroup (operation 725), and may transmit the event to the second drawing effect group 750 through an onSubDraw message (operation 727). The first drawing effect group 740 may display an object on the display device 160 through a drawParticles message (operation 729). The second drawing effect group 750 may display an object on the display device 160 through a drawParticles message (operation 731).

Figure 8:
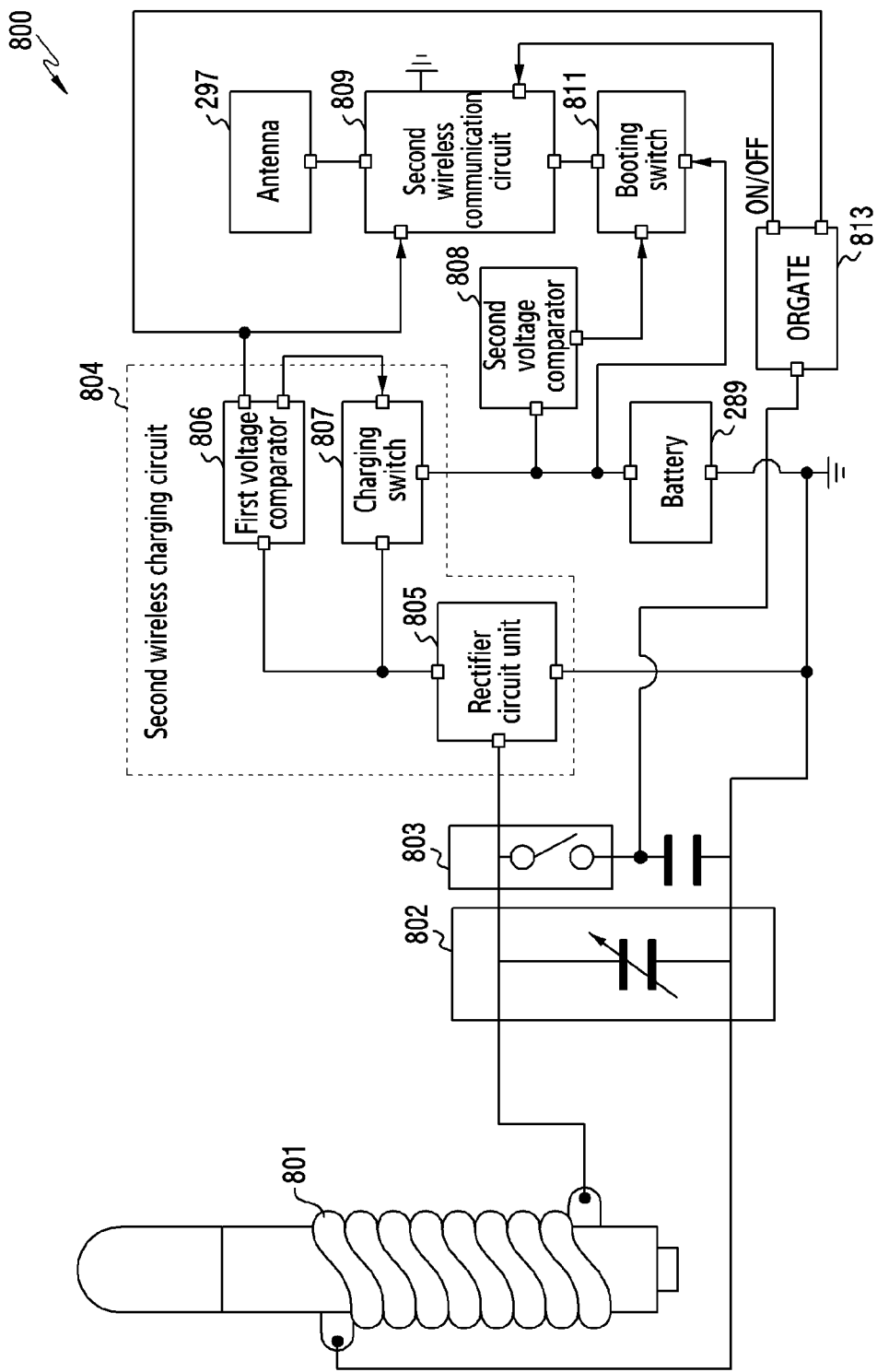
FIG. 8 illustrates the structure 800 of a stylus pen according to various embodiments of the disclosure.

FIG. 8 illustrates the structure 800 of a stylus pen according to various embodiments of the disclosure.

Referring to FIG. 8, the stylus pen 201 (e.g., the digital pen 201 of FIG. 2) according to an embodiment of the disclosure may include a coil 801 (e.g., the resonance circuit 287), a trimmer capacitor 802, a button switch 803, a rectifier circuit unit 805, a first voltage comparator 806, a charging switch 807, a second voltage comparator 808, a second wireless communication circuit 809, an antenna 297, a booting switch 811, a battery 289, and an OR gate 813. The rectifier circuit unit 805, the first voltage comparator 806, and the charging switch 807 may be referred to as a second wireless charging circuit 804 (e.g., the charging circuit 288).

The coil 801 according to an embodiment of the disclosure may be a resonant circuit that is capable detecting an electromagnetic field signal applied from an external device (e.g., the first wireless charging circuit 520 of the electronic device 101) and transmitting a signal with a specific frequency. For example, the coil 801 may be an electromagnetic resonance (EMR) coil. The trimmer capacitor 802 according to an embodiment of the disclosure may store an induced current applied to the coil 801. The button switch 803 according to an embodiment of the disclosure may detect an input (e.g., a press) of a button positioned on one side of a housing of the stylus pen 201. When the button switch 803 is turned on, the resonant frequency of the coil 801 may be changed. In this case, an electronic device may detect a button input through a change in the resonant frequency.

The rectifier circuit unit 805 according to an embodiment of the disclosure may rectify AC power applied to the coil 801 to be converted into DC power and may transmit the converted DC power to the first voltage comparator 806 and the charging switch 807.

The first voltage comparator 806 according to an embodiment of the disclosure may identify a position detection signal or a charging signal based on the voltage of DC power provided from the rectifier circuit unit 805. For example, the charging signal may have a greater value than the position detection signal. When the DC power is less than a reference voltage (e.g., 3 V), the first voltage comparator 806 may determine the DC power as a position detection signal, and when the DC power is the reference voltage or greater, the first voltage comparator 806 may determine the DC power as a charging signal. When the DC power provided from the rectifier circuit unit 805 is a charging signal, the first voltage comparator 806 may provide a signal indicating that the stylus pen 201 has been inserted into the electronic device to the second wireless communication circuit 809. In addition, when the DC power is a charging signal, the first voltage comparator 806 may turn on the charging switch 807, and when the DC power is a position detection signal, the first voltage comparator 806 may turn off the charging switch 807.

The charging switch 807 according to an embodiment of the disclosure may control charging on/off of the battery 289. For example, the charging switch 807 may provide or cut off DC power provided from the rectifier circuit unit 805 to the battery 289 based on the output of the first voltage comparator 806.

The second voltage comparator 808 according to an embodiment of the disclosure may turn on (boot) the second wireless communication circuit 809 when the voltage of the battery 289 is a predetermined voltage or higher.

The second wireless communication circuit 809 according to an embodiment of the disclosure may be disposed in the housing of the stylus pen 201 and may establish wireless communication with an external device (e.g., the first wireless communication circuit 530 of the electronic device 101). The second wireless communication circuit 809 may support a Bluetooth protocol. For example, the second wireless communication circuit 809 may be a BLE communication circuit.

The second wireless communication circuit 809 according to an embodiment of the disclosure may transmit state information (e.g., unique information and charging-related information) about the stylus pen 201 and/or data based on a button input to the first wireless communication circuit 530 through the antenna 297. The antenna 297 according to an embodiment of the disclosure may be electrically connected to the second wireless communication circuit 809 to transmit or receive a wireless signal.

The booting switch 811 according to an embodiment of the disclosure may perform on/off control of the second wireless communication circuit 809. For example, the booting switch 811 may supply or cut off the power of the battery 289 to the second wireless communication circuit 809 based on the output of the second voltage comparator 808.

The battery 289 according to an embodiment of the disclosure is a rechargeable secondary battery, may be charged by DC power from the rectifier circuit unit 805, and may supply power to the second wireless communication circuit 809. For example, the battery 289 may be a supercapacitor.

The OR gate 813 according to an embodiment of the disclosure may provide a signal according to the logical disjunction of the output of the first voltage comparator 806 and a button input to the second wireless communication circuit 809.

An electronic device (e.g., the electronic device 101 of FIG. 1) according to various embodiments may include a touchscreen display (e.g., the display device 160 of FIG. 1), a wireless communication circuit (e.g., the wireless communication module 192 of FIG. 1), a processor (e.g., the processor 120 of FIG. 1) configured to be operatively connected to the touchscreen display and the wireless communication circuit, and a memory (e.g., the memory 130 of FIG. 1) configured to be operatively connected to the processor, wherein the memory may store instructions that, when executed, cause the at least one processor to display a user interface on the touchscreen display, to receive a drawing input having at least one drawing path by a stylus pen (e.g., the digital pen 201 of FIG. 2) or a body part of a user through the user interface, and to display a drawing output on the user interface, the drawing output may include a first layer including a plurality of first objects having a selected shape according to the drawing path and a second layer including a plurality of animated second objects having the selected shape, and the plurality of animated second objects may move in at least one selected direction from the drawing path.

According to various embodiments, at least one of the plurality of animated second objects may decrease in size while moving in the at least one selected direction from the drawing path.

According to various embodiments, the at least one selected direction may include an upward direction or a downward direction of the user interface.

According to various embodiments, the instructions may cause the processor to identify a color selected through the user interface, to determine a color combination based on the identified color, and to display the drawing output including the plurality of first objects and the plurality of animated second objects on the user interface based on the determined color combination.

According to various embodiments, the determined color combination may be formed to include a dark color group and a bright color group based on the identified color.

According to various embodiments, the instructions cause the processor to identify the type of an object selected through the user interface and to display the drawing output including the plurality of first objects and the plurality of animated second objects on the user interface based on the type of the selected object.

According to various embodiments, the type of the selected object may be a first type, and the instructions may cause the processor to move the plurality of animated second objects of the first type based on at least part of an upward direction of the user interface from the drawing path and a direction in which the drawing input is entered.

According to various embodiments, the type of the selected object may be a second type, and the instructions may cause the processor to move the plurality of animated second objects of the second type based on at least part of a downward direction of the user interface from the drawing path and a direction in which the drawing input is entered.

According to various embodiments, the instructions may cause the processor to change the plurality of first objects or the plurality of animated second objects according to a predetermined property according to a change in time for which the drawing input is received and to display the plurality of first objects or the plurality of animated second objects on the user interface.

According to various embodiments, the predetermined property may include at least one of the size, rotation, the transparency, the color, and the velocity of an object.

Generally, when an electronic device (e.g., the electronic device 101 of FIG. 1) receives and displays an input through a stylus pen (e.g., the digital pen 201 of FIG. 2), a stroke of the input may be displayed as it is according to the path of the stylus pen 201 input by a user. In various embodiments, a stroke may refer to a shape or a mark input to the electronic device 101 when the user enters an input to the electronic device 101 using the stylus pen 201.

For example, when a Live Message application of the electronic device 101 is executed, a pop-up window for receiving an input through the stylus pen 201 may be displayed on a display device (e.g., the display device 160 of FIG. 1) of the electronic device 101. The pop-up window may include an indicator indicating an Ink effect, an indicator indicating a Neon effect, and an indicator indicating a Spark effect for an input through the stylus pen 201. When the indicator indicating the Ink effect is selected according to a user input, the output of the stylus pen 201 may be displayed through the Ink effect, when the indicator indicating the Neon effect is selected, the output of the stylus pen 201 may be displayed through the Neon effect, and when the indicator indicating the Spark effect is selected, the output of the stylus pen 201 may be displayed through the Spark effect. The Ink effect may be displaying a stroke of the input through the stylus pen 201 in the same manner as input, the Neon effect may be displaying the color of the stroke of the input through the stylus pen 201 with a blurring effect like fluorescent light, and the Spark effect may be displaying the stroke of the input through the stylus pen 201 with a firework effect. The Ink effect, the Neon effect, and the Spark effect finally display a color selected by the user and the stroke of the input through the stylus pen 201 as they are and may thus not be significantly different from a general display effect of the stroke.

Figure 9:
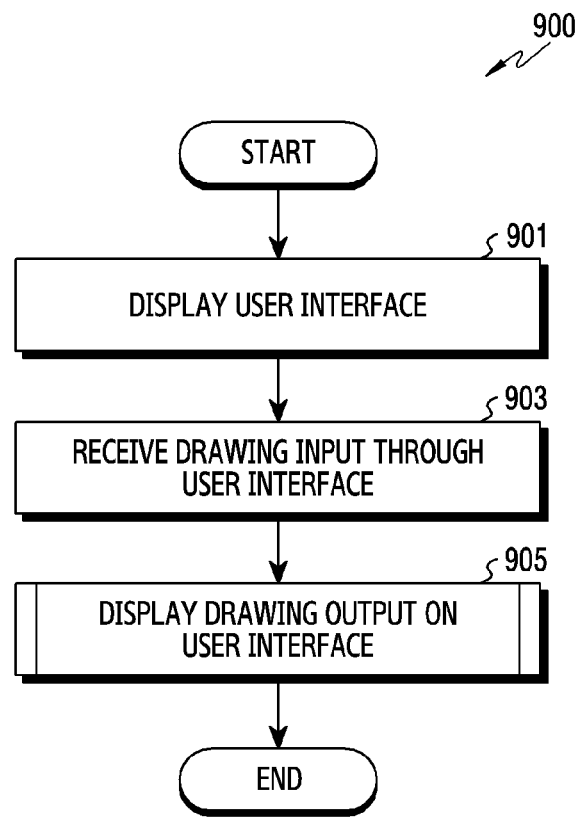
FIG. 9 is a flowchart 900 showing that an electronic device outputs an input from a stylus pen according to various embodiments of the disclosure.

In various embodiments of the disclosure, the Live Message application of the electronic device 101 may not simply display the stroke of the input through the stylus pen 201 but may display the stroke using various colors and various effects based on a selection by the user. Accordingly, it is possible to improve user experience compared to a conventional art. For example, an Alive effect may be an effect of displaying at least one object according to the drawing path of a stroke input to the electronic device 101 by the user. In various embodiments, a color combination applied to the at least one object may be determined based on a color selected by the user, first objects may be displayed along the drawing path, and second objects that move or rotate may be displayed based on the positions of the displayed first objects. A Rainbow effect may be an effect of imparting a change according to a color sequence to an input stroke when the user inputs a drawing. In various embodiments, when the user inputs the drawing based on a color selected by the user, a color combination applied to the color sequence of the input stroke may be determined, and a color sequence to which the color combination determined according to a drawing path is applied may be displayed. FIG. 9 to be described below illustrates a process in which the electronic device 101 receives a drawing input of the user and displays a drawing output to which the Alive effect and the Rainbow effect are applied.

Figure 10:
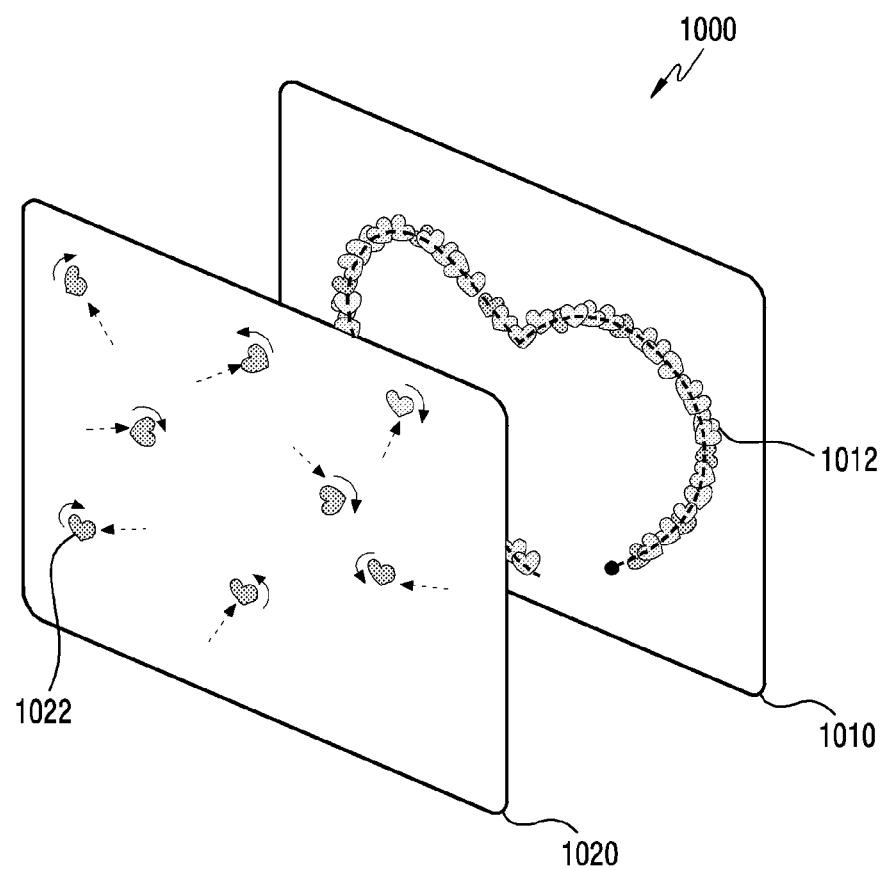
FIG. 10 illustrates an example 1000 in which an electronic device displays first objects and second objects according to various embodiments of the disclosure.

FIG. 9 is a flowchart 900 showing that an electronic device outputs an input from a stylus pen according to various embodiments of the disclosure. FIG. 10 illustrates an example 1000 in which an electronic device displays first objects and second objects according to various embodiments of the disclosure.

In the following embodiments, individual operations may be sequentially performed but may not necessarily be performed in sequence. For example, the individual operations may be performed in a different order, and at least two operations may be performed in parallel. The subject of operations illustrated in the flowchart 900 may be understood as the electronic device 101 or a component (e.g., the processor 120 or the digitizer controller 541) of the electronic device 101.

Referring to FIG. 9, in operation 901, the electronic device (e.g., the processor 120 of FIG. 1) according to various embodiments may display a user interface. In an embodiment, the processor 120 may display the user interface for receiving an input of a user on a display device (e.g., the display device 160 of FIG. 1) of the electronic device 101. For example, the user interface may include an indicator for setting the type of an object used to output a drawing input of the user, an indicator for setting the color of the object, and a canvas for receiving the drawing input of the user.

According to various embodiments, in operation 903, the electronic device (e.g., the processor 120 of FIG. 1) may receive a drawing input through the user interface. In an embodiment, the processor 120 may receive the drawing input of the user through the user interface displayed on the display device (e.g., the display device 160 of FIG. 1). In an embodiment, the drawing input of the user may include at least one drawing path input to the canvas through a stylus pen (e.g., the digital pen 201 of FIG. 2) or a body part of the user. The processor 120 may detect the at least one drawing path received through the user interface.

According to various embodiments, in operation 905, the electronic device (e.g., the processor 120 of FIG. 1) may display a drawing output on the user interface. In an embodiment, the processor 120 may display the drawing output of the user on the display device (e.g., the display device 160 of FIG. 1) according to the type and color of an object selected by the user. In an embodiment, the drawing output of the user may include a first layer including a plurality of first objects. The plurality of first objects may have a shape selected by the user along the drawing path. In an embodiment, the drawing output of the user may include a second layer including a plurality of second objects. The plurality of second objects may be animated objects having a shape selected by the user. For example, the plurality of second objects may move in at least one selected direction from the drawing path. For example, as illustrated in FIG. 10, a first layer 1010 and a second layer 1020 may be displayed. In an embodiment, the first layer 1010 may include first objects 1012 positioned on a drawing path. The second layer 1020 may include second objects 1022 disposed at positions that are the same as or adjacent to the positions of the first objects 1012. In an embodiment, the second objects 1022 may be displayed as moving away from the first objects 1012 or as disappearing, and the direction in which the second objects 1022 move may be changed according to the type of the objects. In an embodiment, the first objects 1012 and the second objects 1022 may be randomly rotated in a clockwise or counterclockwise direction with time and may also be generated and displayed randomly in size, color, transparency, and number. In some embodiments, the first objects 1012 and the second objects 1022 may be displayed with a brightly glowing effect.

In various embodiments, at least one object may be displayed on the display device of the electronic device, and the at least one object may be differently displayed according to the type of the object and a drawing path. Display of at least one object may be defined as shown in FIG. 11.

Figure 11:
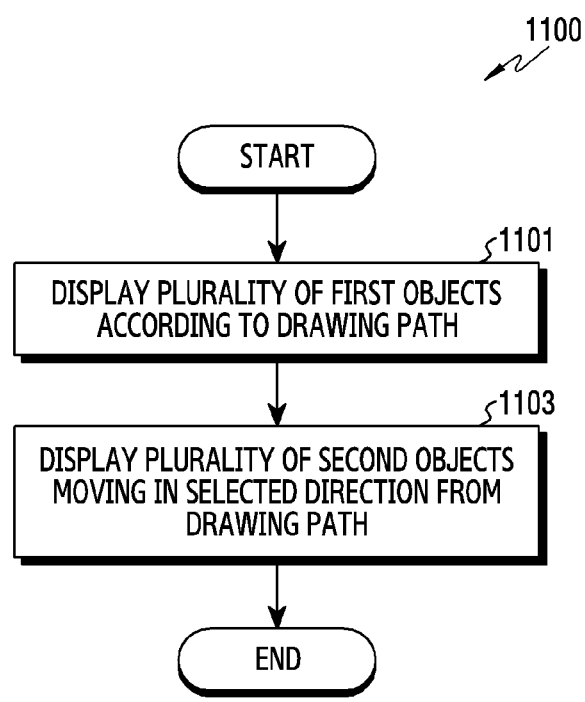
FIG. 11 is a flowchart 1100 showing that an electronic device displays first objects and second objects according to various embodiments of the disclosure.
Figure 12A:
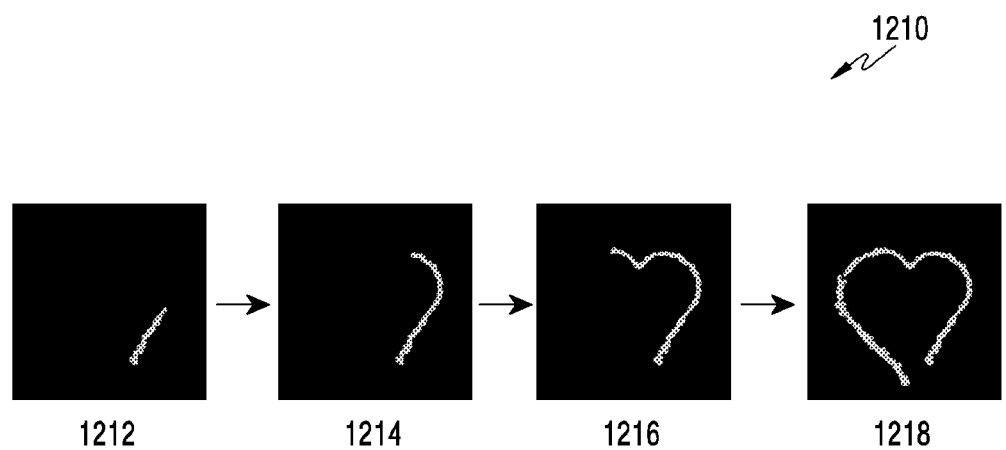
FIG. 12A and FIG. 12B illustrate examples 1210 and 1220 in which an electronic device displays a first object according to various embodiments of the disclosure.
Figure 12B:
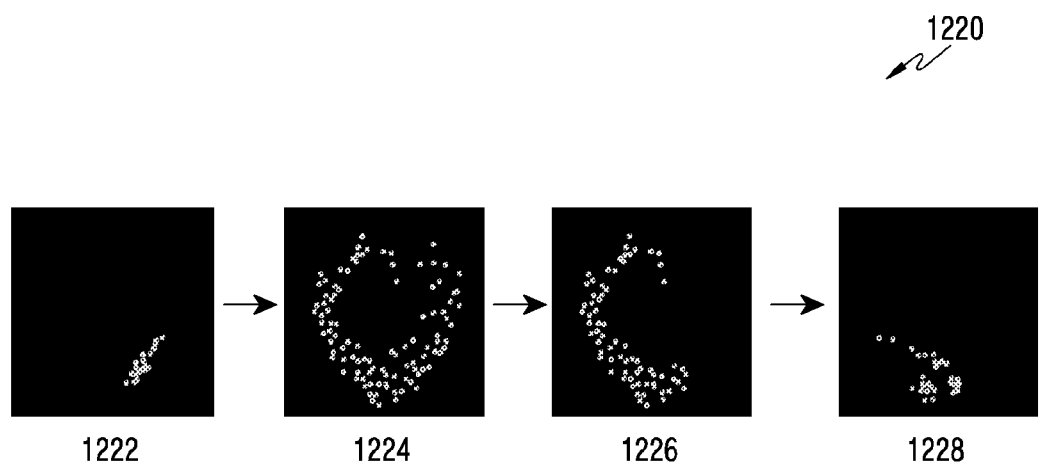

FIG. 11 is a flowchart 1100 showing that an electronic device displays first objects and second objects according to various embodiments of the disclosure. FIG. 12A and FIG. 12B illustrate examples 1210 and 1220 in which an electronic device displays a first object according to various embodiments of the disclosure.

In the following embodiments, individual operations may be sequentially performed but may not necessarily be performed in sequence. For example, the individual operations may be performed in a different order, and at least two operations may be performed in parallel. FIG. 11 is part of operation 905 of FIG. 9, and the subject of operations illustrated in the flowchart 1100 may be understood as the electronic device 101 or a component (e.g., the processor 120 or the digitizer controller 541) of the electronic device 101.

Referring to FIG. 11, in operation 1101, the electronic device (e.g., the processor 120 of FIG. 1) according to various embodiments may display a plurality of first objects according to a drawing path. For example, as illustrated in FIG. 12A, the processor 120 may display the plurality of first objects to be positioned along the drawing path formed in an input path of a stylus pen (e.g., the digital pen 201 of FIG. 2). The plurality of first objects may be displayed as indicated by 1212 to 1218 along the drawing path.

According to various embodiments, in operation 1103, the electronic device (e.g., the processor 120 of FIG. 1) may display a plurality of second objects moving in a selected direction from the drawing path. For example, as illustrated in FIG. 12B, the processor 120 may display the second objects to move upwards or downwards from the drawing path formed in the input path of the stylus pen (e.g., the digital pen 201 of FIG. 2). The plurality of second objects may be displayed as indicated by 1222 to 1228. In an embodiment, when the plurality of second objects moves from the drawing path, the sizes of the plurality of second objects may be reduced or increased.

According to various embodiments, each of the plurality of first objects may be displayed with size, rotation, transparency, color, velocity, and the like changed according to a predefined criterion with time. For example, as illustrated in Table 1, based on the time the first objects are first generated, properties of the first objects may be changed with predefined time.

TABLE 1

|  | Time when object is first generated | Period in which object moves |
|---|---|---|
| Size | Random (4%-10%) | — |
| Scale | 70% | 70% → 100%/800 ms |
| Rotation | Random (0°-360°) | Rotation 0° → 360° Random (1000 ms, 2000 ms-10000 ms) |
| Color | Random (considering color combination of object) | Same |
| Opacity | Random (0%-100%) | 100% |
| Velocity | 75 | 75 |
| Gravity | 0 | 0 |
| Number | 350/1000 ms | — |

Referring to Table 1, in an embodiment, when the first objects are first generated, the size of the objects may be set by randomly reducing the thickness of a stroke of a drawing input entered by a user to 4% to 10%. The first objects may be generated at a scale of 70% of the set size, may randomly rotate from 0° to 360°, and may have a color randomly determined based on the color combination of the first objects. The opacity of the first objects may be randomly determined from 0% to 100%, and the first objects may have a velocity of 75 and a gravity of 0.350 first objects may be generated and displayed for 1000 ms. In an embodiment, in a period in which the first objects move, the scale of the first objects may be changed from 70% of the set size to 100% thereof for 800 ms. For 1000 ms to 10000 ms, the first objects randomly rotate from 0° to 360°, may have the same color as that when the first objects are first generated, and may have an opacity of 100%. The first objects may be displayed with a velocity of 75 and a gravity of 0.

The plurality of second objects according to various embodiments may be displayed as gradually becoming distant from the first objects at positions that are the same as or adjacent to the positions of the first objects on the drawing path or as gradually decreasing in size to disappear in order to impart a three-dimensional effect and vividness in drawing. According to various embodiments, each of the plurality of second objects may be displayed with size, rotation, transparency, color, velocity, and the like changed according to a predefined criterion with time. For example, as illustrated in Table 2, based on the time the second objects are first generated, properties of the second objects may be changed with predefined time.

TABLE 2

|  | Time when object is first generated | Period in which object moves | Period in which object disappears |
|---|---|---|---|
| Size | Random (8%-15%) | — | — |
| Scale | 70% | 70% → 100%/800 ms | 100% → 0%/1250 ms |
| Rotation | Random (0°-360°) | Rotation 0° → 360° Random (1000 ms, 2000 ms-10000 ms) | — |
| Color | Random (considering color combination of object) | Same | Same |
| Opacity | Random (76%-95%) | 100%/3750 ms | 100% → 0%/1250 ms |
| Velocity | 0 | 150 | 150 |
| Gravity | 0 | −20 | −20 |
| Number | 60/1000 ms | — | — |

Referring to Table 2, in an embodiment, when the second objects are first generated, the size of the objects may be set by randomly reducing the thickness of the stroke of the drawing input entered by the user to 8% to 15%. The second objects may be generated at a scale of 70% of the set size, may randomly rotate from 0° to 360°, and may have a color randomly determined based on the color combination of the second objects. The opacity of the second objects may be randomly determined from 76% to 95%, and the second objects may have a velocity of 0 and a gravity of 0.60 second objects may be generated and displayed for 1000 ms. In an embodiment, in a period in which the second objects move, the scale of the second objects may be changed from 70% of the set size to 100% thereof for 800 ms. For 1000 ms to 10000 ms, the second objects randomly rotate from 0° to 360°, may have the same color as that when the second objects are first generated, and may have an opacity increased to 100% for 3750 ms. The second objects may be displayed with a velocity of 150 and a gravity of −20. In an embodiment, in a period in which the second objects disappear, the scale of the second objects may be changed from 100% to 0% for 1250 ms. The color is the same as that when the second objects are first created, and the opacity may be changed from 100% to 0% for 1250 ms. The second objects may be displayed with a velocity of 150 and a gravity of −20. In an embodiment, when the gravity is −20, the second objects may move upwards on a user interface.

According to various embodiments, when the user selects one color and draws, the electronic device may determine and display a color combination based on the color selected by the user, thereby expressing a three-dimensional effect. Display of an object based on a color combination may be defined as shown in FIG. 13.

Figure 13:
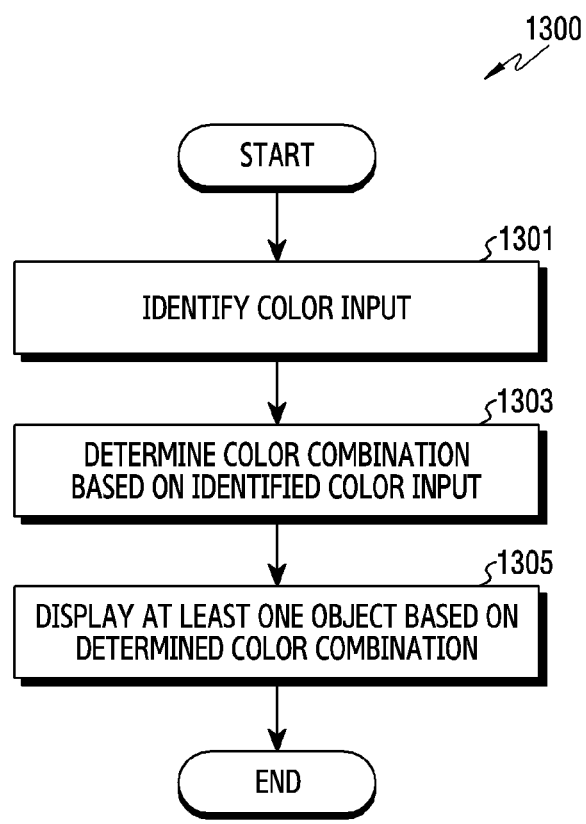
FIG. 13 is a flowchart 1300 showing that an electronic device displays at least one object according to a color combination according to various embodiments of the disclosure.
Figure 14:
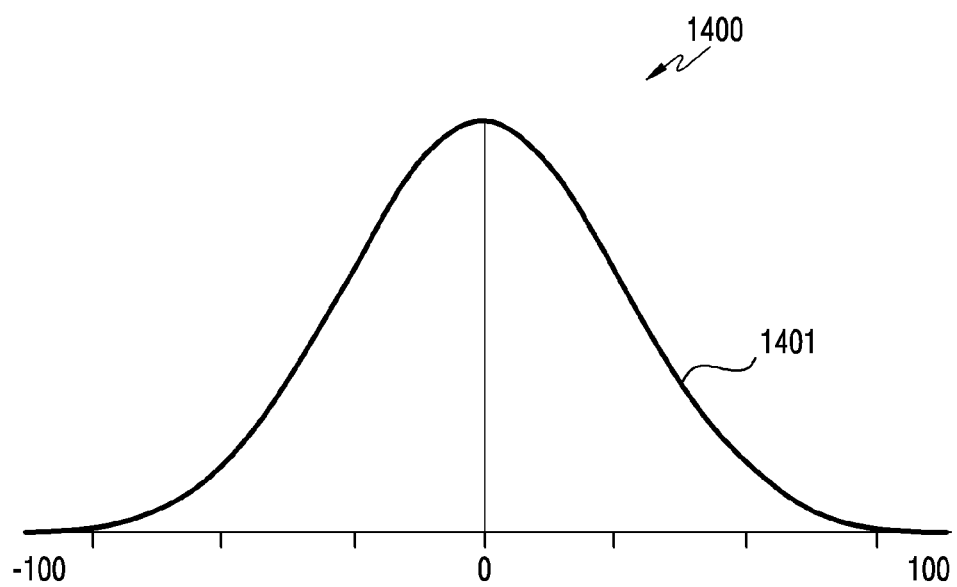
FIG. 14 is a distribution diagram 1400 illustrating the distribution of colors when colors are combined according to various embodiments of the disclosure.

FIG. 13 is a flowchart 1300 showing that an electronic device displays at least one object according to a color combination according to various embodiments of the disclosure. FIG. 14 is a distribution diagram 1400 illustrating the distribution of colors when colors are combined according to various embodiments of the disclosure.

In the following embodiments, individual operations may be sequentially performed but may not necessarily be performed in sequence. For example, the individual operations may be performed in a different order, and at least two operations may be performed in parallel. FIG. 13 is part of operation 905 of FIG. 9, and the subject of operations illustrated in the flowchart 1300 may be understood as the electronic device 101 or a component (e.g., the processor 120 or the digitizer controller 541) of the electronic device 101.

Referring to FIG. 13, in operation 1301, the electronic device (e.g., the processor 120 of FIG. 1) according to various embodiments may identify a color input. In an embodiment, the processor 120 may identify a color selected by a user for a drawing through a user interface. In an embodiment, the user interface may include an indicator displayed for the user to select a color.

According to various embodiments, in operation 1303, the electronic device (e.g., the processor 120 of FIG. 1) may determine a color combination based on the identified color input. For example, the processor 120 may determine a dark or bright color combination based on the color selected by the user. In an embodiment, the color combination may be determined based on the color distribution diagram illustrated in FIG. 14. For example, the middle of the color distribution diagram represents the distribution of the color selected by the user and may occupy the majority of the distribution. When colors are brighter or darker than the color selected by the user, the colors are decreasingly distributed, and the color combination may have a normal distribution as shown in FIG. 14. Accordingly, it is possible to prevent colors darker or brighter than the color selected by the user from being excessively included in the color combination.

According to various embodiments, in operation 1305, the electronic device (e.g., the processor 120 of FIG. 1) may display at least one object based on the determined color combination. In an embodiment, the processor 120 may display the at least one object according to the color combination on a display device (e.g., the display device 160 of FIG. 1) by matching the selected color combination to the at least one object.

Figure 15:
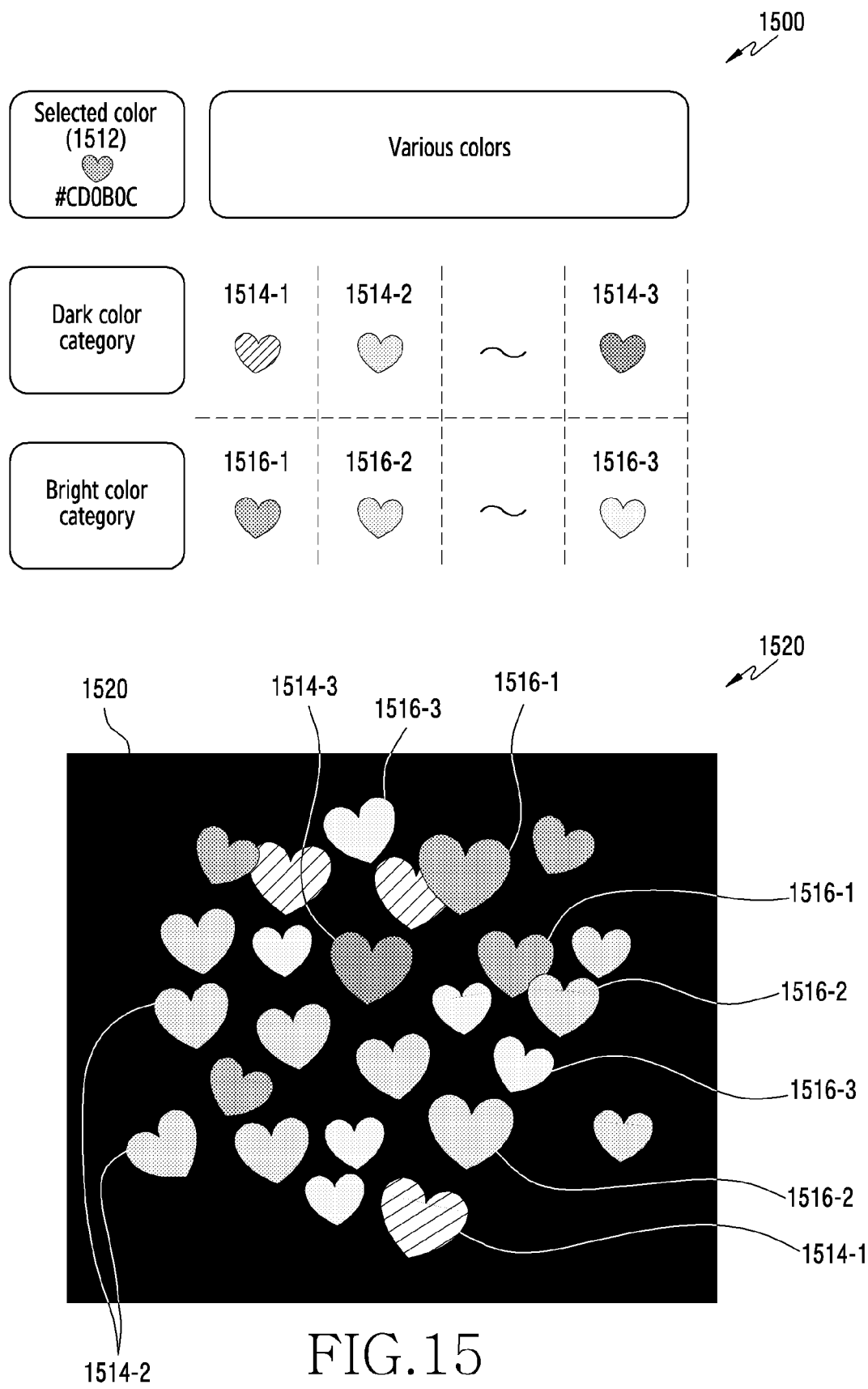
FIG. 15 illustrates an example 1500 of a color combination according to various embodiments of the disclosure.

FIG. 15 illustrates an example 1500 of a color combination according to various embodiments of the disclosure.

FIG. 15 illustrates an example 1500 in which various colors are combined based on a color selected by a user. In various embodiments, an expression such as #CD0B0C may refer to the color code of a color represented in hexadecimal. When the color 1512 selected by the user is a red-group color (e.g. #CD0B0C), the composition of the color may be represented by decimal numbers into which the three primary colors of light (e.g. red (R), green (G), and blue (B)) are converted. For example, the red-group color may be converted into R=205, G=11, and B=12. In an embodiment, values corresponding to R, G, and B may be distributed with 20 color change levels in a color combination. For example, an R value may have a total of 20 color change levels including 10 dark change levels changed by −10 from −10 to −100 and 10 bright change levels changed by +10 from +10 to +100. In this case, the color change value of R may be set to a maximum of 255 or less. In various embodiments, each of R, G, and B may be limited in software to have a value from 0 to a maximum of 255. For example, when R has a value of 255 and G and B have a value of 0, a red color having a maximum value that can be expressed in software may be expressed. When R has a value of 0 and G and B have a value of 0, a black color can be expressed.

Like R, G and B may also have 20 color change levels. For example, a dark color category and a bright color category may be generated based on the color 1512 selected by the user. In an embodiment, colors included in the dark color category may become darker from left to right. For example, a dark color 1514-1 may be a color represented by #C30102, a dark color 1514-2 may be a color represented by #890000, and a dark color 1514-3 may be a color represented by #690000. In an embodiment, colors included in the bright color category may become brighter colors from left to right. For example, a bright color 1516-1 may be a color represented by #C30102, a bright color 1516-2 may be a color represented by #E11F20, and a bright color 1516-3 may be a color represented by #FF6F70. In an embodiment, the dark colors and the bright colors may be displayed (1520) on a display device (e.g., the display device 160 of FIG. 1) of an electronic device (e.g., the electronic device 101 of FIG. 1).

Figure 16:
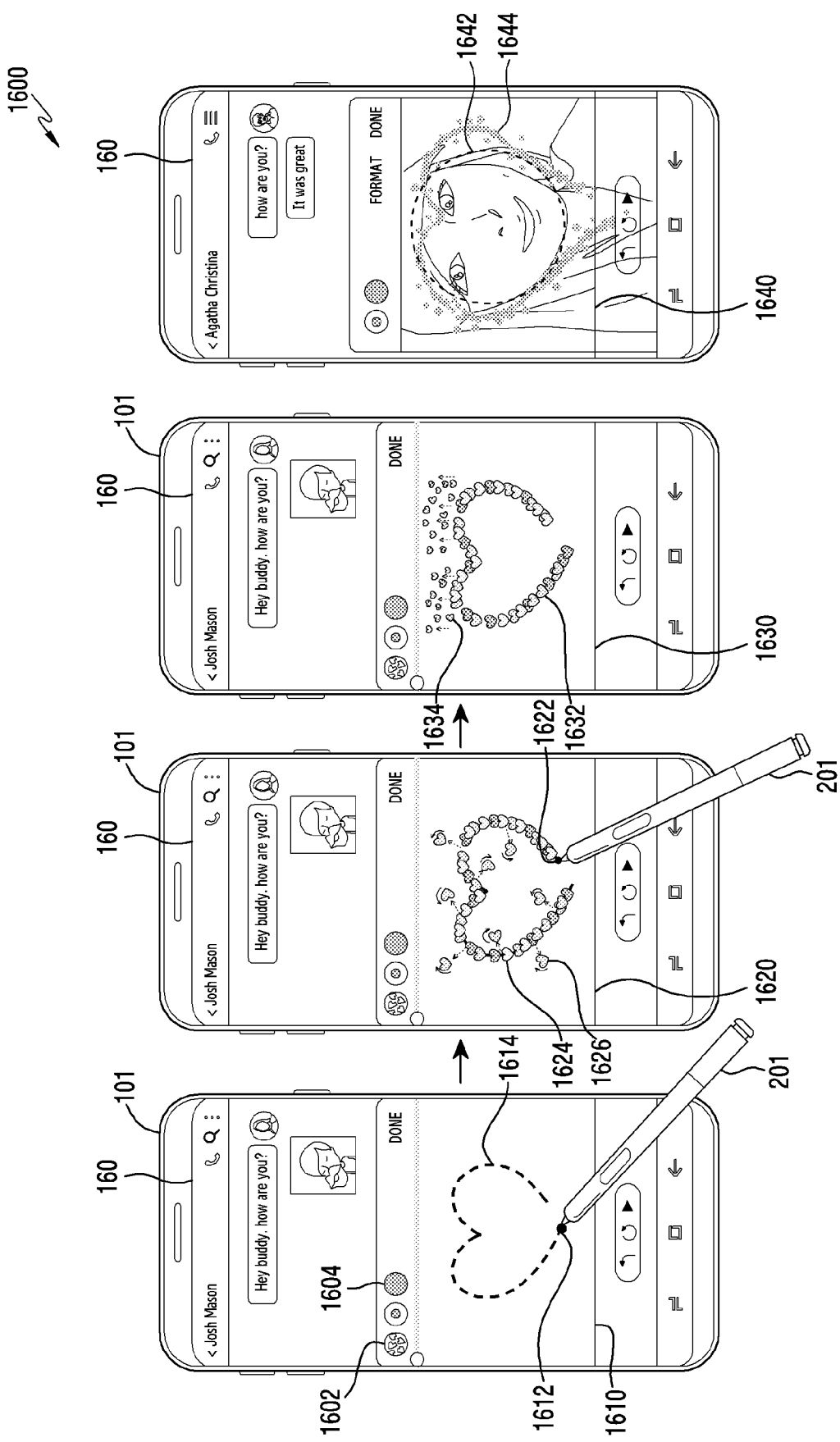
FIG. 16 illustrates an example 1600 in which an electronic device displays an object according to an object type according to various embodiments of the disclosure.

FIG. 16 illustrates an example 1600 in which an electronic device displays an object according to an object type according to various embodiments of the disclosure. The electronic device of FIG. 16 may be the electronic device 101 of FIG. 1.

Referring to FIG. 16, a user may execute a Live Message application on the electronic device 101, may select a Heart Shape effect through a pen effect indicator 1602 displayed on a display device 160 of the electronic device 101, and may also select a color to be applied to an object through an indicator 1604. A drawing by a stylus pen (e.g., the digital pen 201 of FIG. 2) may be input to a canvas 1610 activated by executing the Live Message application. The drawing may be input to the canvas 1610 while forming a drawing path 1614 from a start point 1612. In an embodiment, first objects 1624 may be formed and displayed on a canvas 1620 along the drawing path 1614 input by the stylus pen 201. The drawing path 1614 may be generated from the start point 1612 where the stylus pen 201 is input to an end point 1622. Second objects 1626 may be generated at positions the same as or similar to those of the first objects 1624, and the generated second objects 1626 may rotate. In an embodiment, the first objects and the second objects may have a shape selected by the user. For example, the first objects and the second objects may have a heart shape. In an embodiment, first objects 1632 formed along the drawing path 1614 and second objects 1634 that decrease in size while moving from the drawing path 1614 may be displayed on a canvas 1630. In an embodiment, the moving direction of the second objects 1634 may vary according to the type of an object selected by the user. For example, when the user selects a heart-shaped object, the second objects 1634 may move upwards on a user interface. In an embodiment, the second objects 1634 may move based on the direction of the user interface and a direction in which the user inputs a stroke. For example, when a stroke is input to the right, the second objects 1634 may move upwards on the user interface but may move diagonally upwards to the right in view of the direction of the input stroke. In an embodiment, the user may draw a heart-shaped FIG. 2644 including first objects and second objects through a drawing on a face portion 1642 of a person displayed on a canvas 1640. The user may obtain an image in which the face portion 1642 of the person and the heart-shaped FIG. 2644 are combined.

Figure 17:
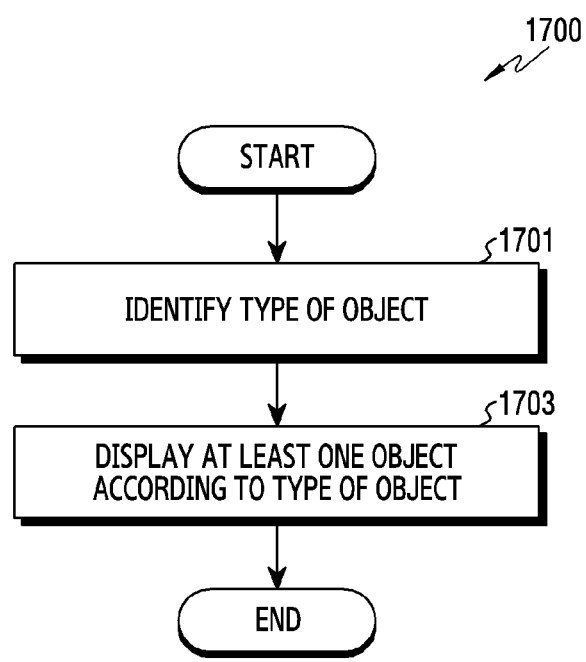
FIG. 17 is a flowchart 1700 showing that an electronic device displays an object according to an object type.

FIG. 17 is a flowchart 1700 showing that an electronic device displays an object according to an object type. In the following embodiments, individual operations may be sequentially performed but may not necessarily be performed in sequence. For example, the individual operations may be performed in a different order, and at least two operations may be performed in parallel. FIG. 17 is part of operation 905 of FIG. 9, and the subject of operations illustrated in the flowchart 1700 may be understood as the electronic device 101 or a component (e.g., the processor 120 or the digitizer controller 541) of the electronic device 101.

Referring to FIG. 17, in operation 1701, the electronic device (e.g., the processor 120 of FIG. 1) according to various embodiments may identify the type of an object. For example, a user may select the type of an object to be displayed through a user interface of a Live Message application. The processor 120 may identify the type of the object selected by the user. For example, the type of the object may include a heart shape or a snowflake shape.

According to various embodiments, in operation 1703, the electronic device (e.g., the processor 120 of FIG. 1) may display at least one object according to the type of the object. For example, when the identified type of the object is a heart shape, the processor 120 may display heart-shaped first objects and heart-shaped second objects on a display device (e.g., the display device 160 of FIG. 1). When the identified type of the object is a snowflake shape, the processor 120 may display snowflake-shaped first objects and snowflake-shaped second objects on the display device (e.g., the display device 160 of FIG. 1). In an embodiment, the direction in which the second objects move may vary according to the type of the object. For example, when the type of the object is the heart shape, the heart-shaped second objects may move upwards on a user interface, and may move diagonally upwards in view of the direction in which a stroke is input. When the type of the object is the snowflake shape, the snowflake-shaped second objects may move downwards on the user interface, and may move diagonally downwards in view of the direction in which a stroke is input. When the type of the object identified by the processor 120 is the heart shape, objects may be displayed as shown in FIG. 16, and when the type of the object identified by the processor 120 is the snowflake shape, objects may be displayed as shown in FIG. 18 to be described below.

Figure 18:
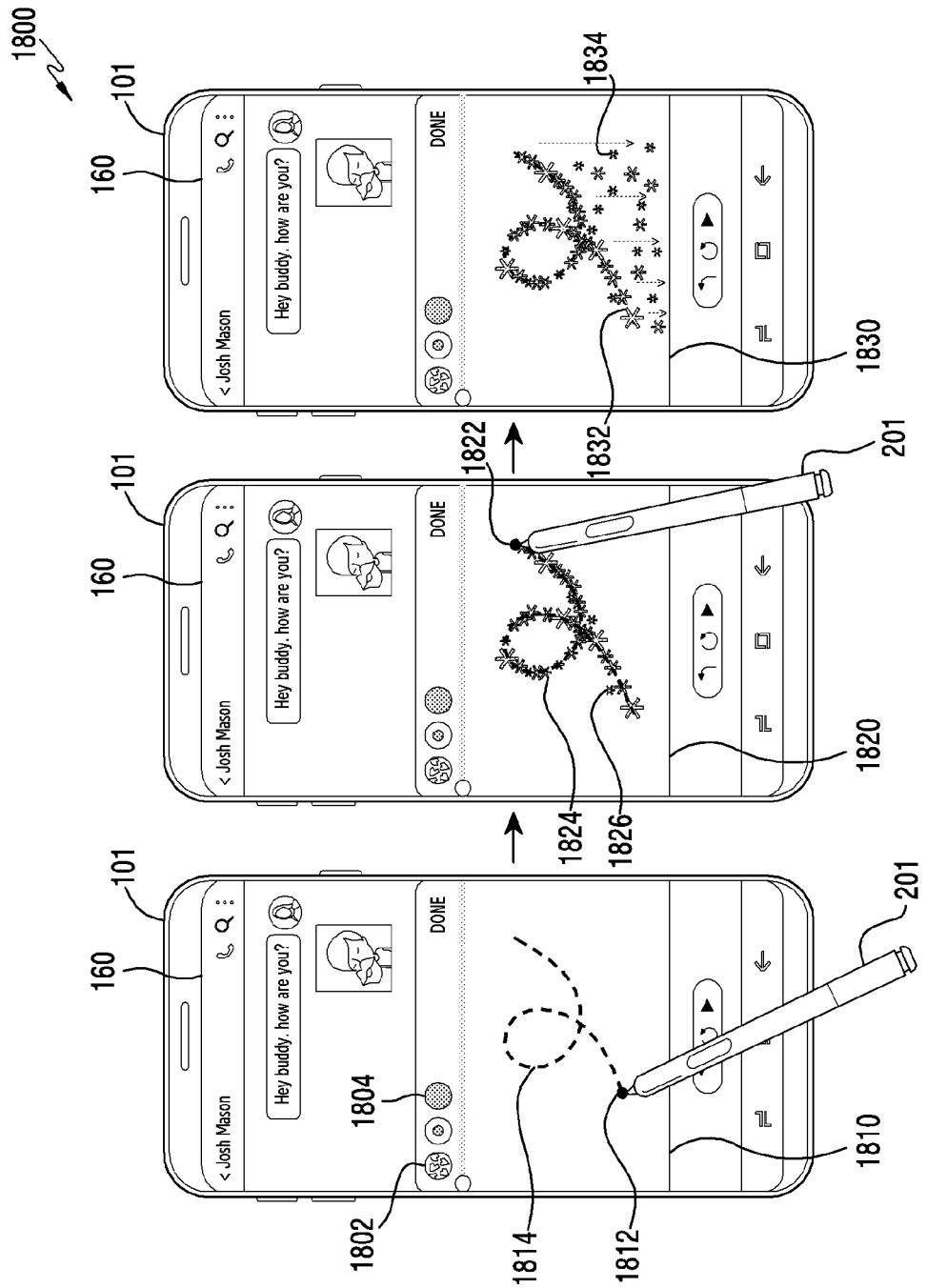
FIG. 18 illustrates an example 1800 in which an electronic device displays an object according to an object type according to various embodiments of the disclosure.

FIG. 18 illustrates an example 1800 in which an electronic device displays an object according to an object type according to various embodiments of the disclosure. The electronic device of FIG. 18 may be the electronic device 101 of FIG. 1.

Referring to FIG. 18, a user may execute a Live Message application on the electronic device 101, may select a Snowflake Shape effect through a pen effect indicator 1802 displayed on a display device 160 of the electronic device 101, and may also select a color to be applied to an object through an indicator 1804. A drawing by a stylus pen (e.g., the digital pen 201 of FIG. 2) may be input to a canvas 1810 activated by executing the Live Message application. The drawing may be input to the canvas 1810 while forming a drawing path 1814 from a start point 1812. In an embodiment, first objects 1824 may be formed and displayed on a canvas 1820 along the drawing path 1814 input by the stylus pen 201. The drawing path 1814 may be generated from the start point 1812 where the stylus pen 201 is input to an end point 1822. Second objects 1826 may be generated at positions the same as or similar to those of the first objects 1824, and the generated second objects 1826 may rotate. In an embodiment, the first objects and the second objects may have a shape selected by the user. For example, the first objects and the second objects may have a snowflake shape. In an embodiment, first objects 1832 formed along the drawing path 1814 and second objects 1834 that decrease in size while moving from the drawing path 1814 may be displayed on a canvas 1830. In an embodiment, the moving direction of the second objects 1834 may vary according to the type of an object selected by the user. For example, when the user selects a snowflake-shaped object, the second objects 1834 may move downwards on a user interface. In an embodiment, the second objects 1834 may move based on the direction of the user interface and a direction in which the user inputs a stroke. For example, when a stroke is input to the right, the second objects 1834 may move downwards on the user interface but may move diagonally downwards to the right in view of the direction of the input stroke.

Figure 19:
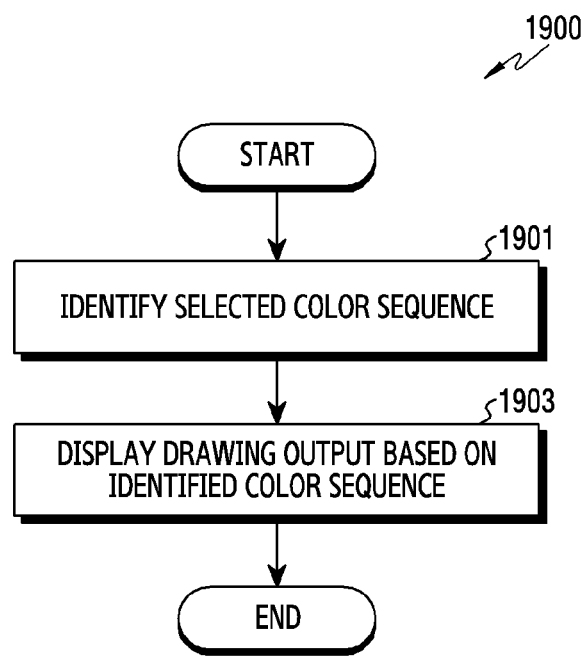
FIG. 19 is a flowchart 1900 showing that an electronic device outputs an input through a stylus pen according to a Rainbow effect according to various embodiments of the disclosure.

As described above, in various embodiments, an effect of displaying first objects along a drawing path input by a user with a stylus pen and displaying second objects rotating or moving based on the positions of the first objects may be applied. In various embodiments, when a user draws, an effect of displaying an input stroke by applying various color changes to the stroke may be applied. FIG. 19 to be described below defines a Rainbow effect as an example of various color changes.

Figure 20:
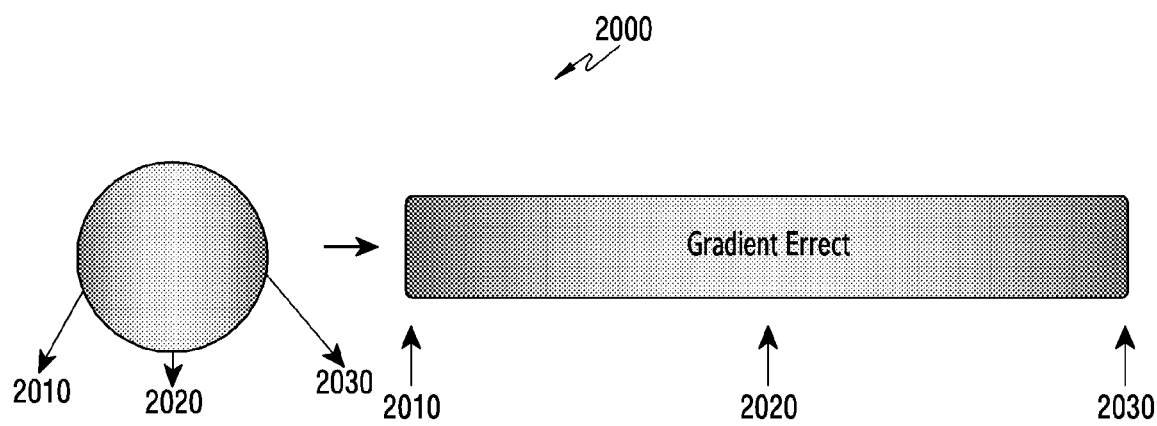
FIG. 20 illustrates an example 2000 of a color sequence used for a Rainbow effect according to various embodiments of the disclosure.
Figure 21:
FIG. 21 illustrates an example 2100 in which an electronic device outputs an input through a stylus pen based on a color sequence according to various embodiments of the disclosure.

FIG. 19 is a flowchart 1900 showing that an electronic device outputs an input through a stylus pen according to a Rainbow effect according to various embodiments of the disclosure. FIG. 20 illustrates an example 2000 of a color sequence used for a Rainbow effect according to various embodiments of the disclosure. FIG. 21 illustrates an example 2100 in which an electronic device outputs an input through a stylus pen based on a color sequence according to various embodiments of the disclosure.

In the following embodiments, individual operations may be sequentially performed but may not necessarily be performed in sequence. For example, the individual operations may be performed in a different order, and at least two operations may be performed in parallel. FIG. 19 is part of operation 905 of FIG. 9, and the subject of operations illustrated in the flowchart 1900 may be understood as the electronic device 101 or a component (e.g., the processor 120 or the digitizer controller 541) of the electronic device 101.

Referring to FIG. 19, in operation 1901, the electronic device (e.g., the processor 120 of FIG. 1) according to various embodiments may identify a selected color sequence. In an embodiment, the color sequence may be defined as a color combination continuously formed through a gradient effect using two or three colors. In an embodiment, the color sequence may be determined as shown in FIG. 20. For example, with a first color code 2010, a second color code 2020, and a third color code 2030 being central to the color sequence, the color sequence may be determined by continuously connecting colors corresponding to the respective color codes through a gradient effect. In an embodiment, a color of the first color code 2010 may be #834aff, a color of the second color code 2020 may be #1b9bf2, and a color of the third color code 2030 may be #734bc. In an embodiment, a user may identify the color sequence selected by the user through a user interface displayed on a display device (e.g., the display device 160 of FIG. 1) of the electronic device 101. For example, the user interface may include an indicator indicating a plurality of color sequences, and the processor 120 may identify the color sequence selected by the user among the plurality of color sequences.

Figure 22A:
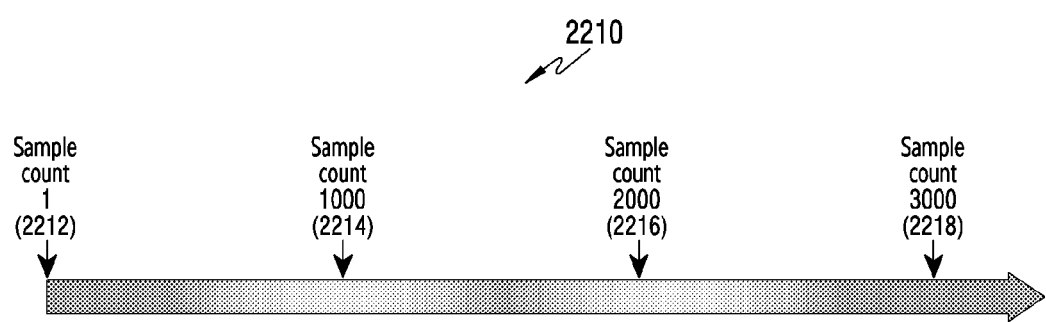
FIG. 22A and FIG. 22B illustrate examples 2210 and 2220 of a Rainbow effect of changing a color based on the input time of a stylus pen according to various embodiments of the disclosure.
Figure 22B:
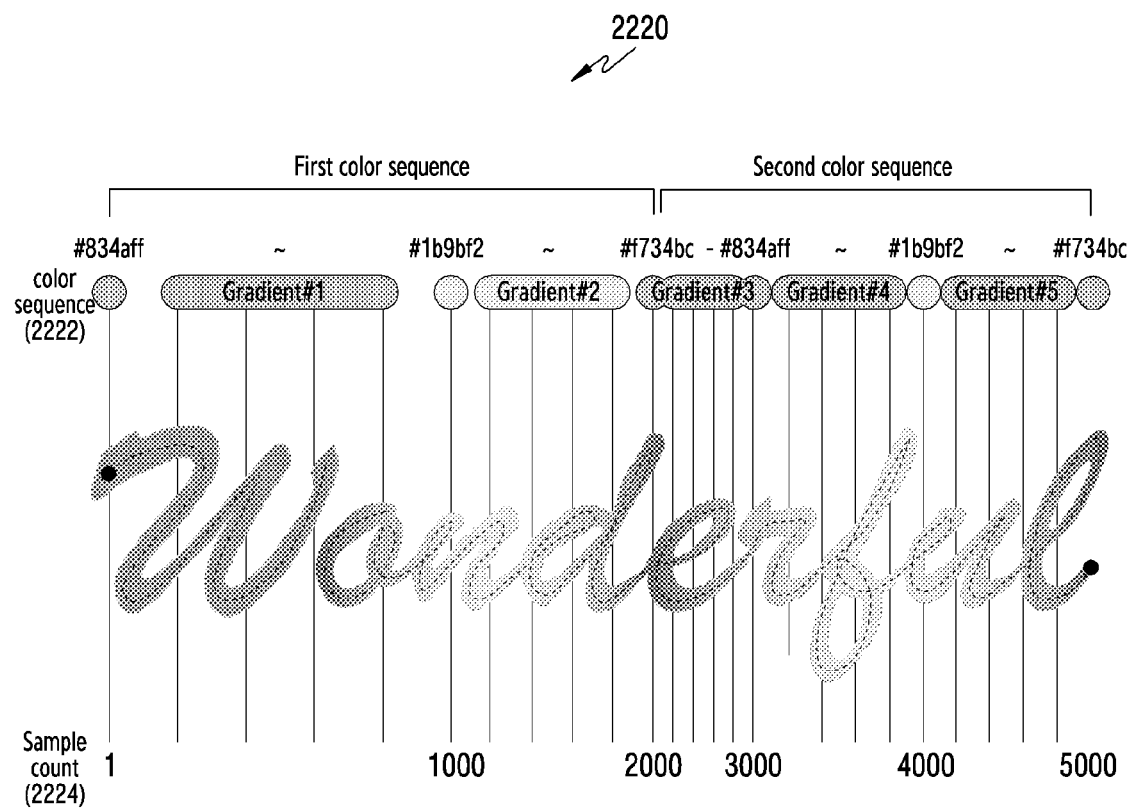

According to various embodiments, in operation 1903, the electronic device (e.g., the processor 120 of FIG. 1) may display a drawing output based on the identified color sequence. In an embodiment, the processor 120 may display the drawing output by reflecting the color sequence selected by the user on a stroke of a drawing input by the user. For example, as shown in FIG. 21, the processor 120 may apply the identified color sequence from a time point 2110 at which the drawing input starts to a time point 2120 at which the drawing input ends, thereby displaying the drawing output on the display device 160. In various embodiments, the drawing output may be displayed on the display device 160 by applying the color sequence according to the time of the drawing input or by changing the thickness of the stroke. In an embodiment, displaying the drawing output based on the color sequence may be defined as a Rainbow effect. FIG. 22A and FIG. 22B to be described below illustrate an example of a drawing output displayed with a color changed according to a color sequence.

FIG. 22A and FIG. 22B illustrate examples 2210 and 2220 of a Rainbow effect of changing a color based on the input time of a stylus pen according to various embodiments of the disclosure.

Referring to FIG. 22A, a color in a color sequence may be changed based on the input time of a drawing input to an interface 177 of an electronic device (e.g., the electronic device 101 of FIG. 1) by the stylus pen (e.g., the digital pen 201 of FIG. 2). For example, when a sample count is accumulated based on the input time of the drawing, the maximum threshold value of the sample count (e.g., 1000) may be determined, and RGB colors may be changed from a current color to a target color until the sample count reaches the maximum threshold value from 1. In FIG. 22A, the sample count may be 1 (2212) at a time point when a drawing input starts, and may be increased to sample count 1000 (2214), sample count 2000 (2216), and sample count 3000 (2218) as the input time of the drawing increases, and a color in the color sequence corresponding to the sample count may be displayed on a display device 160. In an embodiment, a color in the color sequence corresponding to each sample count is shown in Table 3.

TABLE 3

| Sample count | Color in color sequence |
| --- | --- |
| 1 | #834AFF |
| ~ | ~ |
| 1000 | #189BF2 |
| ~ | ~ |
| 2000 | #F734BC |
| ~ | ~ |
| 3000 | #834AFF |
| ~ | ~ |

Referring to Table 3, in an embodiment, sample count 1 may correspond to color #834AFF in the color sequence, sample count 1000 may correspond to color #189BF2 in the color sequence, sample count 2000 may correspond to color #F734BC in the color sequence, and sample count 3000 may correspond to color #834AFF in the color sequence. The electronic device 101 may display a drawing output by reflecting the color in the color sequence corresponding to the sample count.

Referring to FIG. 22B, a color sequence may be changed based on the input time of a drawing input to an interface 177 of an electronic device (e.g., the electronic device 101 of FIG. 1) by the stylus pen (e.g., the digital pen 201 of FIG. 2). In an embodiment, each time a sample count 2224 increases, a color in the color sequence 2222 reflected in a drawing output may be changed. For example, the sample count 2224 may be 1 at a time point when a drawing input starts, and the color sequence 2222 may be determined as a first representative color in a first color sequence, which is #834aff. As the input time of the drawing increases, the value of the sample count 2224 may increase, and the color sequence 2222 may be gradually changed from #834aff as the first representative color of the first color sequence to #1b9bf2 as a second representative color through a first gradient (Gradient #1) effect. When the sample count 2224 is 1000, the color sequence 2222 reflected in the drawing output may be determined as the second representative color #1b9bf2. As the input time of the drawing increases, the color sequence 2222 may be gradually changed from #1b9bf2 as the second representative color to #f734bc as a third representative color through a second gradient (Gradient #2) effect. When the sample count is 2000, the color sequence 2222 reflected in the drawing output may be determined as the third representative color #f734bc. In an embodiment, when a color change according to the first color sequence is terminated, a color change according to a second color sequence may be performed. In an embodiment, the second color sequence may have the same color combination as the first color sequence, and a color reflected in the drawing input may be changed based on the input time of the drawing similarly to color changes in the first color sequence.

Figure 23:
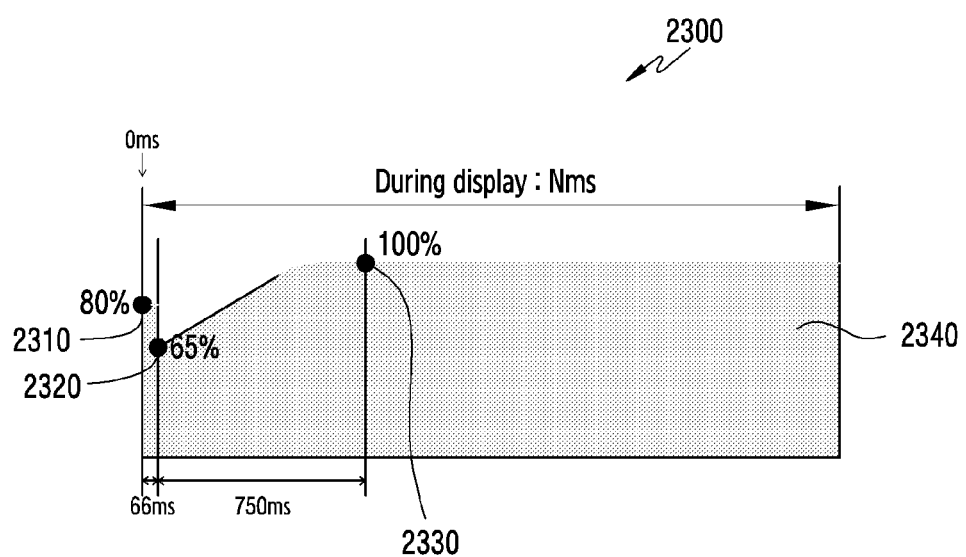
FIG. 23 is a graph 2300 illustrating a Rainbow effect in which the thickness of a stroke is changed based on the input time of a stylus pen according to various embodiments of the disclosure.

In various embodiments, when a drawing output is displayed through a Rainbow effect, the drawing output may be displayed not only with a color changed based on a color sequence as described above but also with the thickness of a stroke of a drawing input changed. FIG. 23 to FIG. 24B to be described below illustrate an example in which a drawing output is displayed with the thickness of a stroke changed according to the input time of a drawing.

FIG. 23 is a graph 2300 illustrating a Rainbow effect in which the thickness of a stroke is changed based on the input time of a stylus pen according to various embodiments of the disclosure.

Referring to FIG. 23, when an electronic device (e.g., the electronic device 101 of FIG. 1) receives a drawing input through a stylus pen (e.g., the digital pen 201 in FIG. 2), a stroke of a drawing output may be displayed with a thickness of 80% of the thickness of a stroke of the drawing input at a time point 2310 when the drawing output is first generated, and may then be displayed with the thickness 2340 of the stroke changed from 65% of the thickness of the stroke of the drawing input at a time point 2320 to 100% thereof at a time point 2330 while being displayed. With respect to the drawing input through the stylus pen 201, the stroke of the drawing output may be displayed with the thickness changed according to the input time of the stylus pen 201, thus providing a user experience like a real effect of an ink gradually spreading on a piece of paper.

Figure 24A:
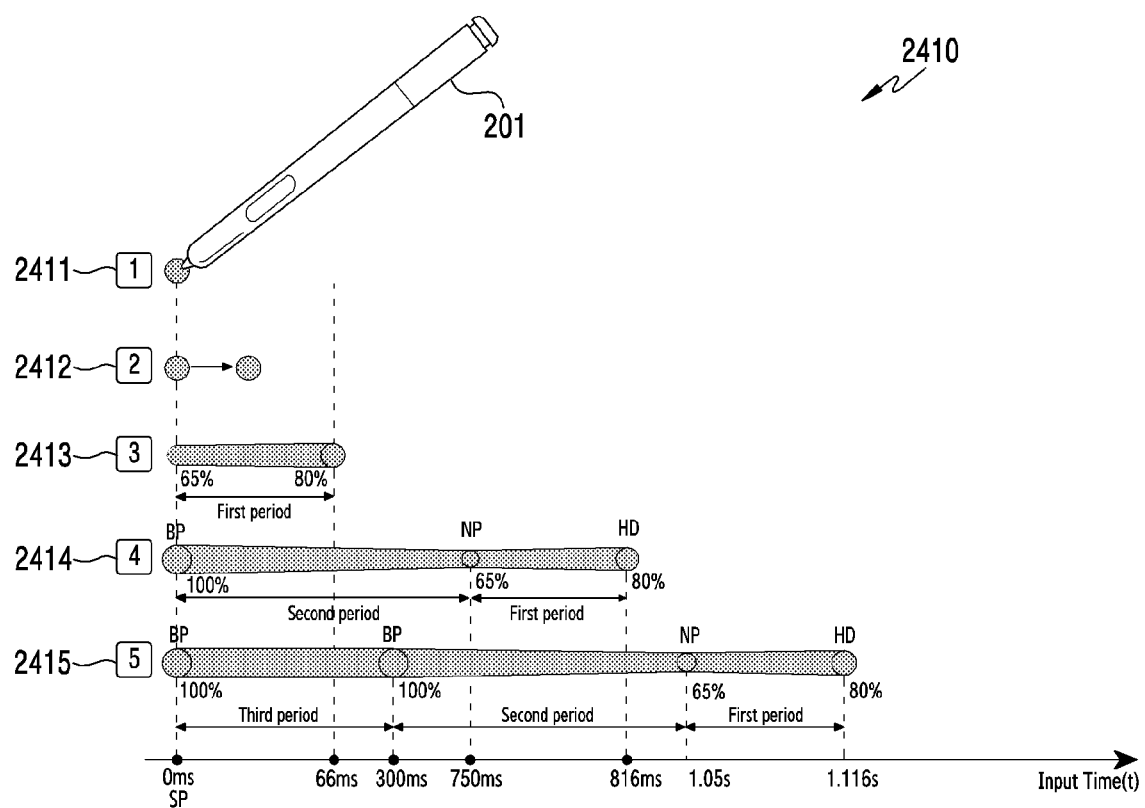
FIG. 24A and FIG. 24B illustrate examples 2410 and 2420 of a Rainbow effect of changing the thickness of a stroke based on the input time of a stylus pen according to various embodiments of the disclosure.
Figure 24B:
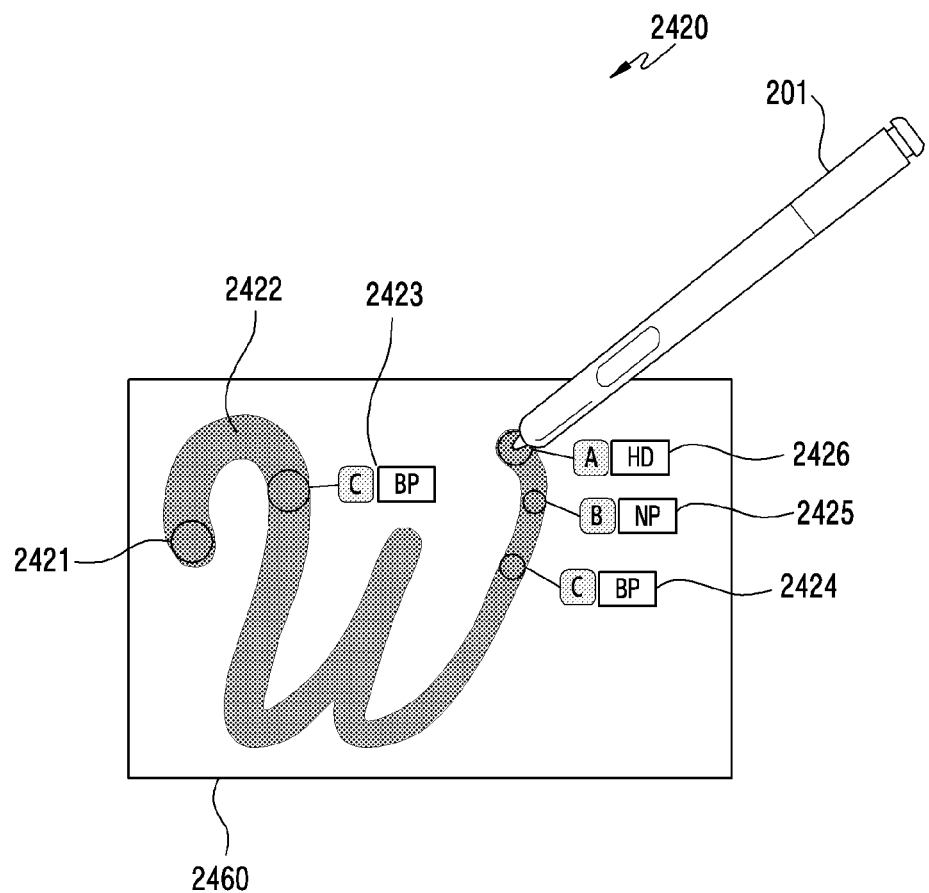

FIG. 24A and FIG. 24B illustrate examples 2410 and 2420 of a Rainbow effect of changing the thickness of a stroke based on the input time of a stylus pen according to various embodiments of the disclosure.

FIG. 24A shows a time point when a drawing input through a stylus pen (e.g., the digital pen 201 of FIG. 2) starts to a first operation 2411 to a fifth operation 2415 in which a drawing output is displayed. For example, in the first operation 2411, a stroke of the drawing output may be displayed with a thickness of 80% of the thickness of a stroke of the drawing input at a point (e.g., a head (HD)) at which the stylus pen 201 is input based on the time point (e.g., a start point (SP)) when the drawing input starts. In a second operation 2412, as the stylus pen 201 moves, the start point of the drawing input may be different from the point at which the stylus pen 201 is input. In a third operation 2413, when the time of the drawing input is 66 ms, the stroke of the drawing output at the start point of the drawing input may be displayed with a thickness of 65%. In an embodiment, the stroke of the drawing output having a thickness of 65% may be defined as a neck point (NP). In a fourth operation 2414, when the time of the drawing input is 816 ms, the stroke of the drawing output at the start point of the drawing input may be displayed with a thickness of 100%. In an embodiment, the stroke of the drawing output having a thickness of 100% may be defined as a body point (BP). In the fourth operation 2414, the stroke of the drawing output may be displayed as the body point at the start point of the drawing input, the neck point when the time of the drawing input is 750 ms, and the head when the time of the drawing input is 816 ms. In the fifth operation 2415, the stroke of the drawing output may be displayed as the body point at the start point of the drawing input, the body point when the time of the drawing input is 300 ms, the neck point when the time of the drawing input is 1.05 s, and the head when the time of the drawing input is 1.16 s. In an embodiment, the thickness of the stroke of the drawing output may be maintained at 80% of the thickness of the stroke of the drawing input at the head as the point at which the stylus pen 101 is input, and may be gradually changed from 80% of the thickness of the stroke of the drawing input to 65% thereof during a first period. In an embodiment, during a second period in which the drawing input is displayed and starts to be recognized by a user, the thickness of the stroke of the drawing output may be gradually changed from 65% of the thickness of the stroke of the drawing input to 100% thereof. In an embodiment, during a third period, the thickness of the stroke of the drawing output may be maintained at 100% of the thickness of the stroke of the drawing input. As described above, the stroke of the drawing output may be displayed with the thickness changed according to the time of the drawing input, and may be displayed on a display device 160 of an electronic device as illustrated in FIG. 24B. Referring to FIG. 24B, a drawing path 2422 may be formed from a position 2421 at which a drawing input starts according to the drawing input through the stylus pen 201, and body points 2423 and 2424 having a thickness of 100% of the thickness of a stroke of the drawing input, a neck point 2425 having a thickness of 65% of the thickness of the stroke of the drawing input, and a head 2426 having a thickness of 80% of the thickness of the stroke of the drawing input may be formed on the drawing path 2422 according to the time of the drawing input and may be displayed on a display device 160.

Figure 25:
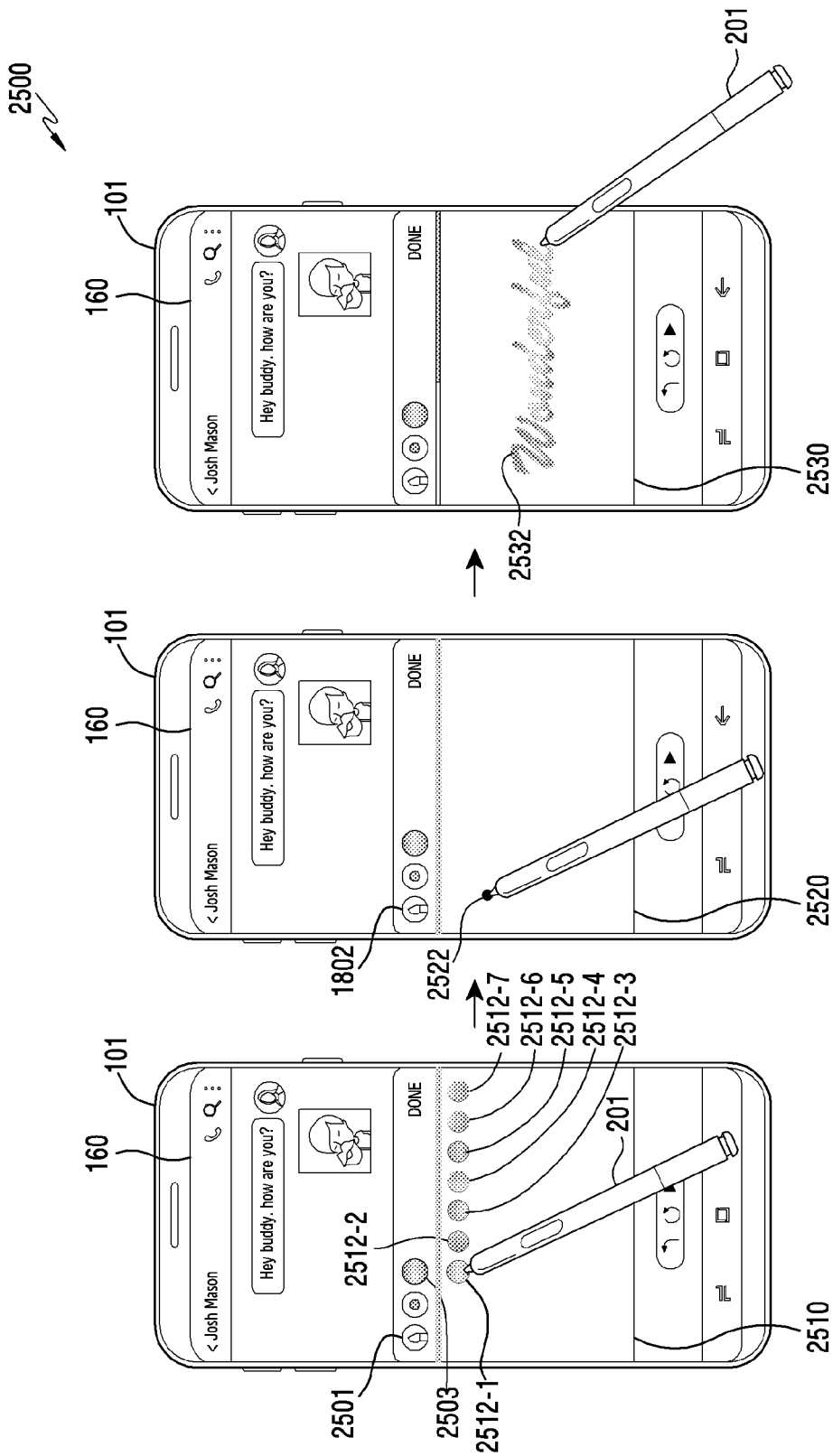
FIG. 25 illustrates an example 2500 in which an electronic device displays a Rainbow effect according to various embodiments of the disclosure.

As described above, a Rainbow effect of displaying a stroke of a drawing output with a color changed according to a color sequence and with the thickness changed according to the time of a drawing input may be displayed on the electronic device 101 as shown in FIG. 25 to be described below.

FIG. 25 illustrates an example 2500 in which an electronic device displays a Rainbow effect according to various embodiments of the disclosure. The electronic device of FIG. 25 may be the electronic device 101 of FIG. 1.

Referring to FIG. 25, a user may execute a Live Message application on the electronic device 101, may select a Rainbow effect through a pen effect indicator 2501 displayed on a display device 160 of the electronic device 101, and may select a desired color sequence through a color sequence indicator 2503. For example, when the user selects the color sequence indicator 2503, a plurality of color sequences 2512-1 to 2512-7 may be displayed, and the user may select at least one color sequence 2512-1 from among the plurality of color sequences 2512-1 to 2512-7. In an embodiment, when the Live Message application is executed, a canvas 2510 for receiving a drawing input through a stylus pen (e.g., the digital pen 201 of FIG. 2) may be displayed. The user may input a stroke on the canvas 2520 from a start point 2522, which is a position where the input through the stylus pen 201 starts. According to the drawing input entered by the user, the selected color sequence 2512-1 and a drawing output 2532 to which a thickness change is applied may be displayed on the canvas 2530. For example, the drawing output 2532 may be displayed with a gradient effect sequentially applied according to the selected color sequence 2512-1. When the drawing input is entered through the stylus pen 201, the drawing output may be displayed with the thickness gradually changed as if an ink actually spreads on a piece of paper.

Figure 26:
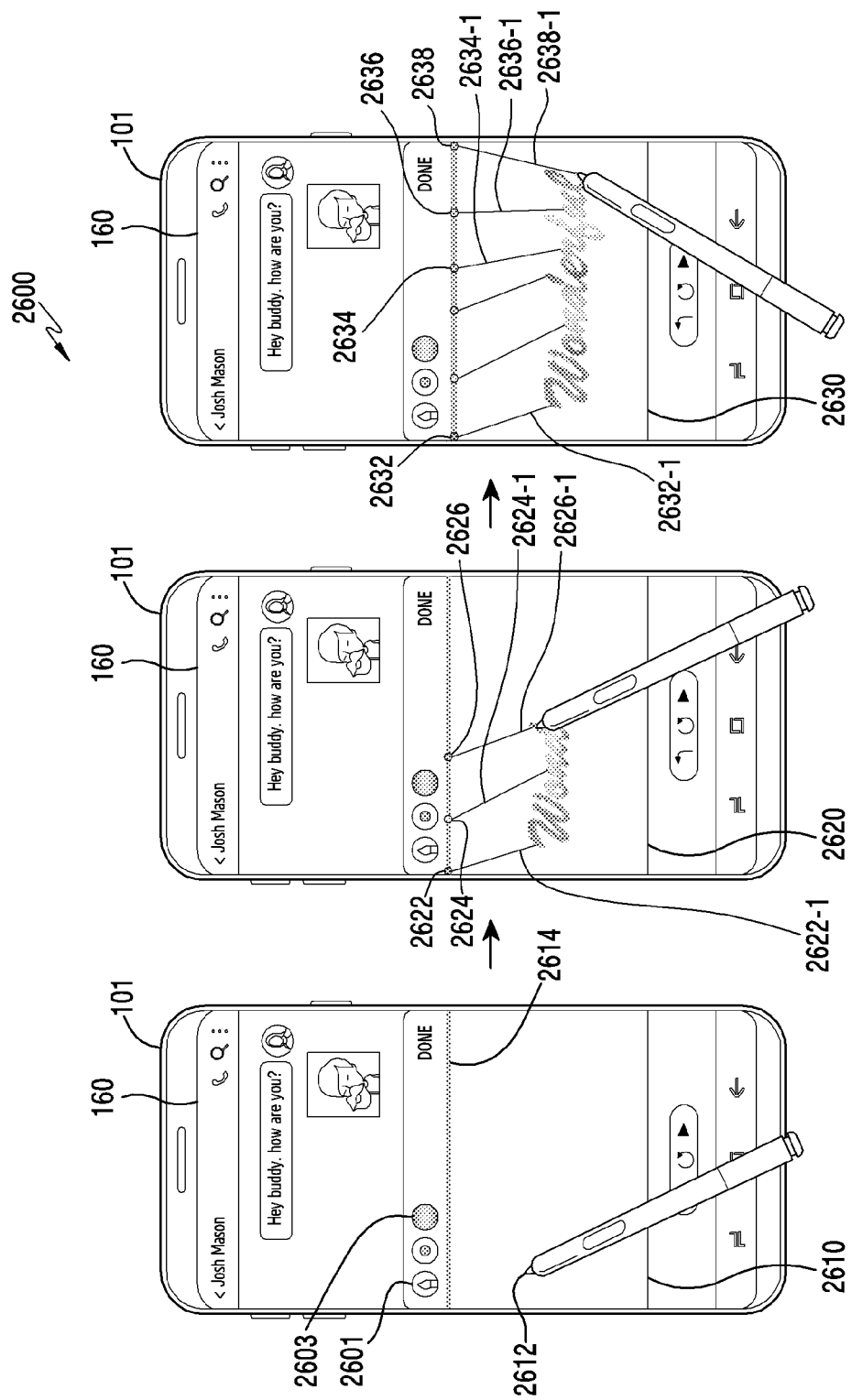
FIG. 26 illustrates an example 2600 in which an electronic device displays a progress bar according to a Rainbow effect according to various embodiments of the disclosure.
Figure 27:
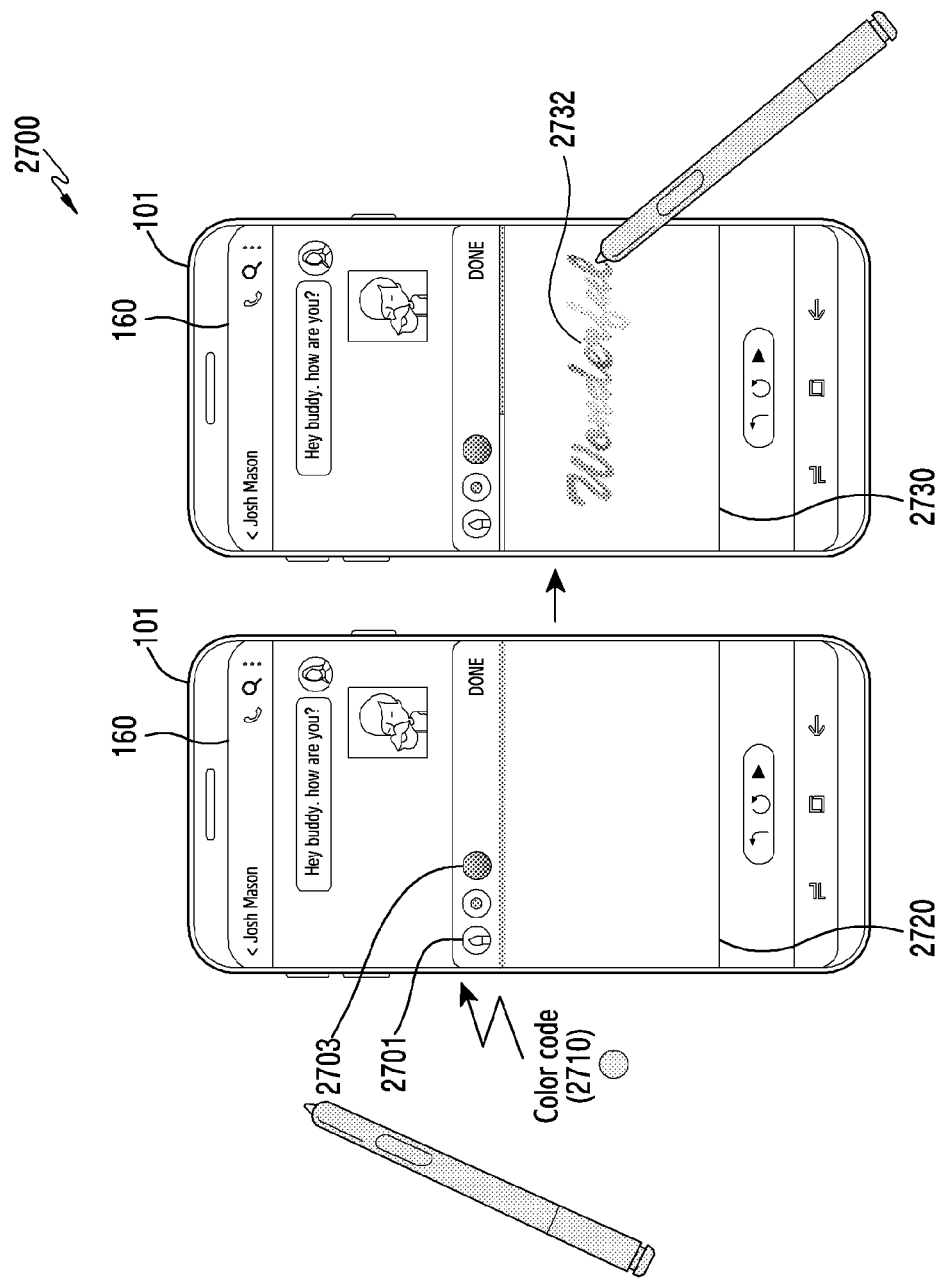
FIG. 27 illustrates an example 2700 in which an electronic device changes and displays a color sequence through communication between the electronic device and a stylus pen according to various embodiments of the disclosure.

FIG. 26 and FIG. 27 to be described below illustrate an additional embodiment applicable together with the foregoing Rainbow effect.

FIG. 26 illustrates an example 2600 in which an electronic device displays a progress bar according to a Rainbow effect according to various embodiments of the disclosure. The electronic device of FIG. 26 may be the electronic device 101 of FIG. 1.

Referring to FIG. 26, when a user executes a Live Message application on the electronic device 101, selects a Rainbow effect through a pen effect indicator 2601 displayed on a display device 160 of the electronic device 101, and selects a desired color sequence through a color sequence indicator 2603, a color combination reflected in a drawing output may vary according to the color sequence selected by the user. In an embodiment, since it may be difficult for the user to recognize which color combination is reflected in the drawing output, a progress bar 2614 may be used. For example, the color sequence may be displayed on the progress bar 2614 according to a stroke of a drawing input based on a position 2612 at which the input through a stylus pen 201 starts. In an embodiment, the progress bar 2614 may be displayed on an upper portion of a canvas 2610.

In an embodiment, when the user enters a drawing input to a canvas 2620, a color sequence corresponding to the drawing input may be displayed on the progress bar 2614 according to the time of the drawing input. For example, a sample count increases by 1 based on a time point 2622 at which a stroke of the drawing input starts, thus displaying a time point 2624 at which the sample count is 1000 and a time point 2626 at which the sample count is 2000 in order on the progress bar 2614, and the time points may be displayed as being connected to points of a drawing output having the corresponding color sequence by lines 2622-1, 2624-1, and 2626-1. For example, the time point 2622 at which the stroke of the drawing input starts may be displayed as being connected to the line 2622-1, the time point 2624 at which the sample count is 1000 may be displayed as being connected to the line 2624-1, and the time point 2626 at which the sample count is 2000 may be displayed as being connected to the line 2626-1.

In an embodiment, when the user enters a drawing input to a canvas 2630, a color sequence corresponding to the drawing input may be displayed on the progress bar 2614 according to the time of the drawing input. A time point 2632 at which a stroke of the drawing input starts, a time point 2634 at which the sample count is 3000, a time point 2636 at which the sample count is 4000 in order on the progress bar 2614, and a time point 2638 at which the drawing input is completed may be displayed in order on the progress bar 2614, and the time points may be displayed as being connected to points of a drawing output having the corresponding color sequence by lines 2632-1, 2634-1, 2636-1, and 2638-1. For example, the time point 2632 at which the stroke of the drawing input starts may be displayed as being connected to the line 2632-1, the time point 2634 at which the sample count is 3000 may be displayed as being connected to the line 2634-1, the time point 2636 at which the sample count is 4000 may be displayed as being connected to the line 2636-1, and the time point 2638 at which the drawing input is completed may be displayed as being connected to the line 2638-1.

FIG. 27 illustrates an example 2700 in which an electronic device changes and displays a color sequence through communication between the electronic device and a stylus pen according to various embodiments of the disclosure. The electronic device of FIG. 27 may be the electronic device 101 of FIG. 1.

Referring to FIG. 27, the electronic device 101 and the stylus pen (e.g., the digital pen 201 of FIG. 2) may communicate with each other, thereby transmitting a color code stored in the stylus pen 201 to the electronic device 101. For example, at least one color code 2710 may be stored in an internal memory (not shown) of the stylus pen 201. When the electronic device 101 and the stylus pen 201 are paired with each other through wireless communication, the stylus pen 201 may transmit the stored color code 2710 to the electronic device 101, and the electronic device 101 may display a color sequence determined based on the received color code 2710 on a display device 160. In an embodiment, the electronic device 101 may display a pen effect indicator 2701 for selecting a Rainbow effect and a color sequence indicator 2703 on a canvas 2720. When the electronic device 101 receives the color code 2710, the electronic device 101 may display the color sequence to which the received color code is applied through the color sequence indicator 2703. A user may input a drawing through the stylus pen 201, and the electronic device 101 may display a drawing output 2732 to which the color sequence determined based on the received color code is applied on a canvas 2730 according to the drawing input. Accordingly, the color code included in the specific stylus pen may be applied to a Rainbow effect or an Alive effect.

An operating method of an electronic device (e.g., the electronic device 101 of FIG. 1) according to various embodiments may include displaying a user interface on a touchscreen display (e.g., the display device 160 of FIG. 1), receiving a drawing input having at least one drawing path by a stylus pen (e.g., the digital pen 201 of FIG. 2) or a body part of a user through the user interface, and displaying a drawing output on the user interface, wherein the drawing output may include a first layer including a plurality of first objects having a selected shape according to the drawing path and a second layer including a plurality of animated second objects having the selected shape, and the plurality of animated second objects may move in at least one selected direction from the drawing path.

According to various embodiments, at least one of the plurality of animated second objects may decrease in size while moving in the at least one selected direction from the drawing path.

According to various embodiments, the at least one selected direction may include an upward direction or a downward direction of the user interface.

According to various embodiments, the displaying of the drawing output on the user interface may include identifying a color selected through the user interface, determining a color combination based on the identified color, and displaying the drawing output including the plurality of first objects and the plurality of animated second objects on the user interface based on the determined color combination.

According to various embodiments, the determined color combination may be formed to include a dark color group and a bright color group based on the identified color.

According to various embodiments, the displaying of the drawing output on the user interface may include identifying a type of an object selected through the user interface and displaying the drawing output including the plurality of first objects and the plurality of animated second objects on the user interface based on the type of the selected object.

According to various embodiments, the type of the selected object may be a first type, and the plurality of animated second objects of the first type may be moved based on at least part of an upward direction of the user interface from the drawing path and a direction in which the drawing input is entered.

According to various embodiments, the type of the selected object may be a second type, and the plurality of animated second objects of the second type may be moved based on at least part of a downward direction of the user interface from the drawing path and a direction in which the drawing input is entered.

According to various embodiments, the plurality of first objects or the plurality of animated second objects may be changed based on a predetermined property according to a change in time for which the drawing input is received and may be displayed on the user interface.

According to various embodiments, the predetermined property may include at least one of the size, rotation, the transparency, the color, and the velocity of an object.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

In the aforementioned specific exemplary embodiments, a constitutional element included in the invention is expressed in a singular or plural form according to the specific example embodiment proposed herein. However, the singular or plural expression is selected properly for a situation proposed for the convenience of explanation, and thus the various exemplary embodiments of the present invention are not limited to a single or a plurality of constitutional elements. Therefore, a constitutional element expressed in a plural form can also be expressed in a singular form, or vice versa.

While the present invention has been shown and described with reference to certain preferred embodiments thereof, it will be understood by those skilled in the art that various changes in form and details may be made therein without departing from the spirit and scope of the present invention as defined by the appended claims. Therefore, the scope of the present invention is defined not by the detailed description thereof but by the appended claims, and all differences within equivalents of the scope will be construed as being included in the present invention.

The invention claimed is:

1. An electronic device comprising:
a touchscreen display;
a wireless communication circuit;
a processor configured to be operatively connected to the touchscreen display and the wireless communication circuit; and
a memory configured to be operatively connected to the processor, wherein the memory stores instructions that, when executed, cause the processor to:
display a user interface on the touchscreen display;
receive a drawing input having a drawing path by a stylus pen or a body part of a user through the user interface; and
display a drawing output corresponding to the drawing input on the user interface,
wherein the drawing output comprises:
a first layer comprising a plurality of first objects that are generated to have a selected shape and are displayed along the drawing path, and
a second layer comprising a plurality of animated second objects that are generated to have the selected shape and are displayed as moving away from the drawing path in at least one selected direction at positions that are a same as or adjacent to positions of the plurality of first objects on the drawing path.

2. The electronic device as claimed in claim 1, wherein at least one of the plurality of animated second objects decreases in size while moving in the at least one selected direction.

3. The electronic device as claimed in claim 1, wherein the at least one selected direction comprises an upward direction or a downward direction of the user interface.

4. The electronic device as claimed in claim 1, wherein the instructions cause the processor to:
identify a color selected through the user interface;
determine a color combination based on the identified color; and
display the drawing output comprising the plurality of first objects and the plurality of animated second objects on the user interface based on the determined color combination.

5. The electronic device as claimed in claim 4, wherein the determined color combination is formed to comprise a dark color group and a bright color group based on the identified color.

6. The electronic device as claimed in claim 1, wherein the instructions cause the processor to:
 identify a type of an object selected through the user interface; and
 display the drawing output comprising the plurality of first objects and the plurality of animated second objects on the user interface based on the type of the selected object.

7. The electronic device as claimed in claim 6, wherein the instructions cause the processor to:
 when the type of the selected object is a first type, move the plurality of animated second objects of the first type based on at least part of an upward direction of the user interface from the drawing path and a direction in which the drawing input is entered; and
 when the type of the selected object is a second type, move the plurality of animated second objects of the second type based on at least part of a downward direction of the user interface from the drawing path and the direction in which the drawing input is entered.

8. The electronic device as claimed in claim 1, wherein the instructions cause the processor to change the plurality of first objects or the plurality of animated second objects based on a predetermined property according to a change in time for which the drawing input is received and to display the plurality of first objects or the plurality of animated second objects on the user interface.

9. The electronic device as claimed in claim 8, wherein the predetermined property comprises at least one of a size, rotation, a transparency, a color, and a velocity of an object.

10. An operating method of an electronic device, the method comprising:
 displaying a user interface on a touchscreen display;
 receiving a drawing input having a drawing path by a stylus pen or a body part of a user through the user interface; and
 displaying a drawing output corresponding to the drawing input on the user interface,
 wherein the drawing output comprises:
  a first layer comprising a plurality of first objects that are generated to have a selected shape and are displayed along the drawing path, and
  a second layer comprising a plurality of animated second objects that are generated to have the selected shape and are displayed as moving away from the drawing path in at least one selected direction at positions that are a same as or adjacent to positions of the plurality of first objects on the drawing path.

11. The method as claimed in claim 10, wherein at least one of the plurality of animated second objects decreases in size while moving in the at least one selected direction.

12. The method as claimed in claim 10, wherein the displaying of the drawing output on the user interface comprises:
 identifying a color selected through the user interface;
 determining a color combination based on the identified color; and
 displaying the drawing output comprising the plurality of first objects and the plurality of animated second objects on the user interface based on the determined color combination.

13. The method as claimed in claim 10, wherein the displaying of the drawing output on the user interface comprises:
 identifying a type of an object selected through the user interface; and
 displaying the drawing output comprising the plurality of first objects and the plurality of animated second objects on the user interface based on the type of the selected object.

14. The method as claimed in claim 10, further comprising changing the plurality of first objects or the plurality of animated second objects based on a predetermined property according to a change in time for which the drawing input is received and displaying the plurality of first objects or the plurality of animated second objects on the user interface.

15. The method as claimed in claim 10, wherein the at least one selected direction comprises an upward direction or a downward direction of the user interface.

16. The method as claimed in claim 12, wherein the determined color combination is formed to comprise a dark color group and a bright color group based on the identified color.

17. The method as claimed in claim 13, further comprising:
 when the type of the selected object is a first type, moving the plurality of animated second objects of the first type based on at least part of an upward direction of the user interface from the drawing path and a direction in which the drawing input is entered; and
 when the type of the selected object is a second type, moving the plurality of animated second objects of the second type based on at least part of a downward direction of the user interface from the drawing path and the direction in which the drawing input is entered.

18. The method as claimed in claim 14, wherein the predetermined property comprises at least one of a size, rotation, a transparency, a color, and a velocity of an object.

* * * * *